US007677997B2

(12) United States Patent
Hiramatsu et al.

(10) Patent No.: US 7,677,997 B2
(45) Date of Patent: Mar. 16, 2010

(54) DOUBLE PISTON AND BELT TYPE CONTINUOUSLY VARIABLE TRANSMISSION

(75) Inventors: Takeo Hiramatsu, Kyoto (JP); Yoshihiro Kono, Shizuoka (JP); Seiichiro Takahashi, Kanagawa (JP); Jonggap Kim, Kanagawa (JP); Yasushi Yabe, Shizuoka (JP)

(73) Assignee: JATCO Ltd, Fuji-shi (JP)

( * ) Notice: Subject to any disclaimer, the term of this patent is extended or adjusted under 35 U.S.C. 154(b) by 859 days.

(21) Appl. No.: 11/266,488

(22) Filed: Nov. 4, 2005

(65) Prior Publication Data

US 2006/0111208 A1 May 25, 2006

(30) Foreign Application Priority Data

Nov. 8, 2004 (JP) ............................. 2004-324177
Dec. 24, 2004 (JP) ............................. 2004-374684

(51) Int. Cl.
F16H 61/02 (2006.01)
G05D 11/00 (2006.01)

(52) U.S. Cl. ........................ 474/28; 474/18; 137/112

(58) Field of Classification Search .................. 474/18, 474/28; 475/207, 210; 74/665 GE; 137/112
See application file for complete search history.

(56) References Cited

U.S. PATENT DOCUMENTS

| | | | | |
|---|---|---|---|---|
| 3,600,960 A | * | 8/1971 | Karig et al. ................... 474/12 |
| 3,782,213 A | * | 1/1974 | Rattunde ..................... 474/28 |
| 4,143,558 A | * | 3/1979 | Van Deursen et al. ......... 474/28 |
| 4,439,170 A | * | 3/1984 | Steuer ......................... 474/28 |
| 4,448,211 A | * | 5/1984 | Yoshida ....................... 137/112 |
| 4,884,997 A | * | 12/1989 | Hattori ......................... 474/28 |
| 5,180,339 A | * | 1/1993 | Haley et al. ................... 474/28 |
| 5,184,981 A | * | 2/1993 | Wittke ......................... 474/19 |
| 5,201,687 A | * | 4/1993 | Friedmann ................... 474/18 |
| 5,203,233 A | * | 4/1993 | Hattori et al. ................. 477/45 |
| 5,217,412 A | * | 6/1993 | Indlekofer et al. ............ 474/69 |
| 5,514,047 A | * | 5/1996 | Tibbles et al. ................. 477/46 |
| 5,725,447 A | * | 3/1998 | Friedmann et al. ............ 474/18 |
| 5,879,253 A | * | 3/1999 | Friedmann et al. ............ 474/18 |
| 6,174,253 B1 | * | 1/2001 | Walter et al. .................. 474/18 |
| 6,280,357 B1 | * | 8/2001 | Van Spijk .................... 474/16 |
| 6,336,878 B1 | * | 1/2002 | Ehrlich et al. ................. 474/28 |
| 6,336,880 B1 | * | 1/2002 | Agner .......................... 474/28 |
| 6,358,181 B1 | * | 3/2002 | Friedmann et al. ............ 477/37 |
| 6,506,136 B2 | * | 1/2003 | Schmid et al. ................ 474/18 |
| 6,561,934 B2 | * | 5/2003 | Kashiwase ................... 474/28 |
| 6,565,464 B1 | * | 5/2003 | Panther ....................... 474/28 |
| 6,585,613 B1 | * | 7/2003 | Walter et al. .................. 474/8 |

(Continued)

FOREIGN PATENT DOCUMENTS

JP 60095248 A * 5/1985

(Continued)

*Primary Examiner*—Robert A Siconolfi
*Assistant Examiner*—Stephen Bowes
(74) *Attorney, Agent, or Firm*—Foley & Lardner LLP

(57) ABSTRACT

A double piston and belt type continuously variable transmission comprises a primary pulley provided with a primary piston chamber and a primary clamp chamber; a secondary pulley provided with a secondary piston chamber and a secondary clamp chamber; and an endless belt operatively put around the primary and secondary pulleys. A switching circuit is arranged to connect both the primary and secondary clamp chambers to either one of the primary and secondary piston chambers, which shows a higher hydraulic pressure than the other.

14 Claims, 13 Drawing Sheets

U.S. PATENT DOCUMENTS

| | | | |
|---|---|---|---|
| 6,679,805 B2 * | 1/2004 | Rienks et al. | 477/49 |
| 6,712,724 B2 | 3/2004 | Katou | |
| 7,025,706 B2 | 4/2006 | Katou | |
| 2002/0160867 A1 | 10/2002 | Katou | |
| 2003/0114259 A1 * | 6/2003 | Luh | 474/28 |
| 2004/0214669 A1 * | 10/2004 | Katou et al. | 474/28 |
| 2005/0014584 A1 * | 1/2005 | Katou et al. | 474/28 |
| 2005/0153805 A1 * | 7/2005 | Koyama | 474/28 |

FOREIGN PATENT DOCUMENTS

| | | | |
|---|---|---|---|
| JP | 2002-327814 | | 11/2002 |
| JP | 2002-327814 A | | 11/2002 |
| JP | 2002327814 A | * | 11/2002 |
| JP | 2004-239351 A | | 8/2004 |

* cited by examiner

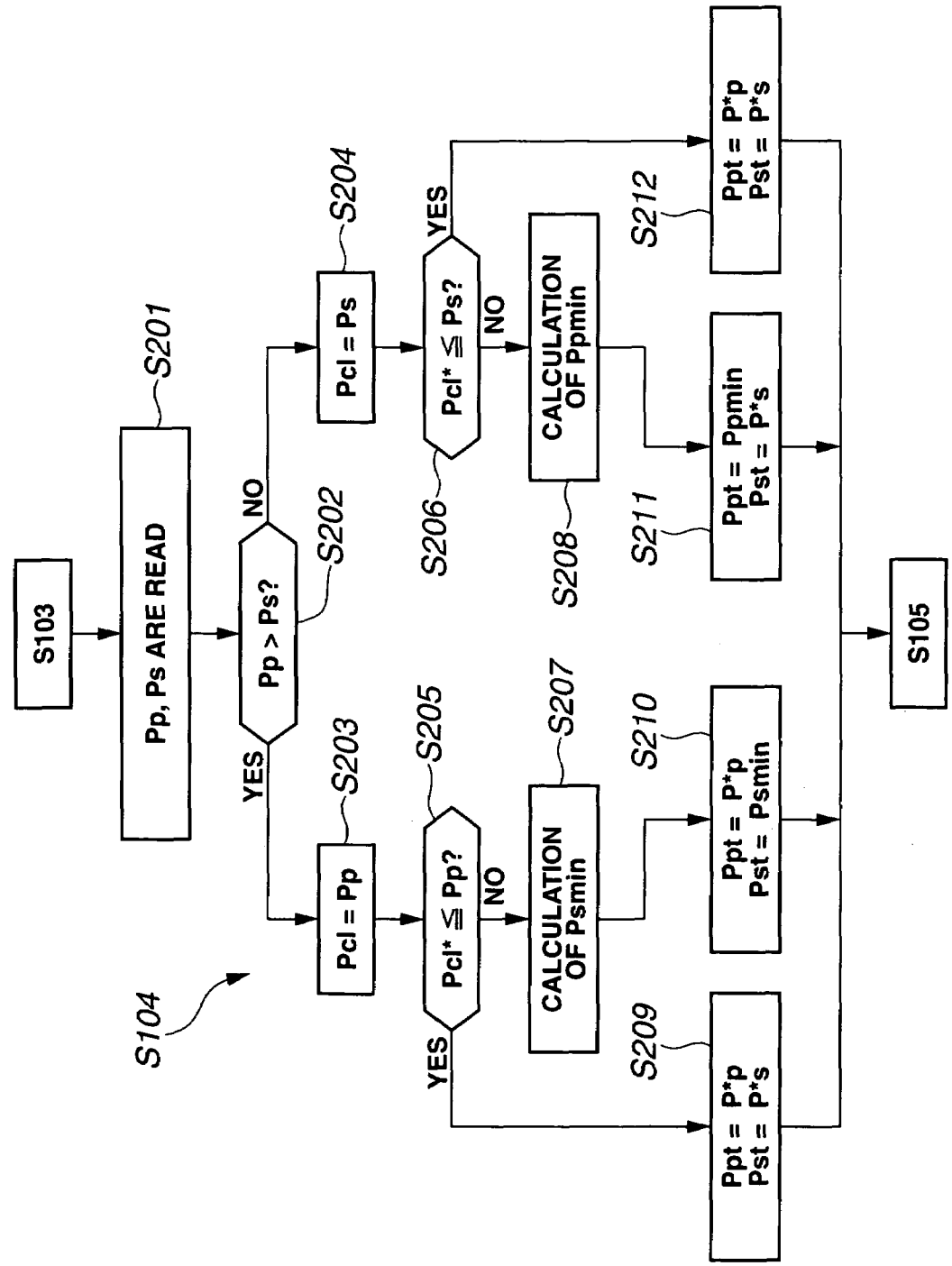

DOUBLE PISTON AND BELT TYPE CONTINUOUSLY VARIABLE TRANSMISSION

BACKGROUND OF THE INVENTION

1. Field of the Invention

The present invention relates in general to belt type continuously variable transmissions and more particularly to the belt type continuously variable transmissions of a double piston type wherein two piston chambers are provided for each of primary and secondary pulleys for controlling rotation of the pulleys.

2. Description of the Related Art

In the belt type continuously variable transmissions, an endless belt is put around the primary and secondary pulleys in such a manner that each pulley holds the belt to carry out a thrust transmission therebetween. That is, the thrust transmission is carried out between each pulley and the belt with the aid of a frictional force generated therebetween. However, if the frictional force generated is not sufficiently large as compared with the belt driving force, a belt slippage takes place which induces not only a poor thrust transmission between the pulley and the belt but also a wearing of the belt and/or the pulley.

Accordingly, in the double piston and belt type continuously variable transmissions such as one disclosed in Japanese Laid-open Patent Application (Tokkai) 2002-327814, each of the primary and secondary pulleys is provided with two piston chambers, one being a piston chamber constructed to control the speed of the pulley and the other being a clamp chamber for suppressing the belt slippage. In the published Application, the respective clamp chambers of the primary and secondary pulleys are connected through a common passage for applying these two pulleys with an even clamping pressure. In addition to this, measures are further employed by which input/output flow of the hydraulic pressure into and from the clamp chambers is reduced as little as possible.

SUMMARY OF THE INVENTION

In the above-mentioned double piston and belt type continuously variable transmission, the pressure fed to the respective clamp chambers of the primary and secondary pulleys is adjusted by a pressure control valve that is electronically controlled by a control unit. However, in order to control the pressure control valve in a satisfied manner, the control unit has to exactly process various and complicated control signals, which brings about increase in production cost of the transmission. Furthermore, in order to compensate a pressure drop that is inevitably generated at the time of pressure controlling, the pump output has to be increased to a sufficiently high level, which however brings about a poor fuel consumption of an associated automotive engine.

Furthermore, in the above-mentioned double piston and belt type continuously variable transmission, the respective clamp chambers of the primary and secondary pulleys are connected through the common passage. Thus, the primary and secondary pulleys are constantly applied with the same clamping pressure. However, it has been revealed that this arrangement tends to induce a marked drop of the hydraulic pressure in the respective clamp chambers because of nature of a hydraulic pressure response limit. Of course, in such case, undesired belt slippage tends to occur.

Accordingly, the present invention aims to provide a double piston and belt type continuously variable transmission, which is free of the above-mentioned drawbacks.

According to a first aspect of the present invention, there is provided a double piston and belt type continuously variable transmission which comprises a primary pulley provided with a primary piston chamber and a primary clamp chamber; a secondary pulley provided with a secondary piston chamber and a secondary clamp chamber; an endless belt operatively put around the primary and secondary pulleys; and a switching circuit that is arranged to connect both the primary and secondary clamp chambers to either one of the primary and secondary piston chambers, which shows a higher hydraulic pressure than the other.

According to a second aspect of the present invention, there is provided a double piston and belt type continuously variable transmission which comprises a primary pulley provided with a primary piston chamber and a primary clamp chamber; a secondary pulley provided with a secondary piston chamber and a secondary clamp chamber; an endless belt operatively put around the primary and secondary pulleys; a hydraulic passage that connects the primary and secondary clamp chambers; a pressure control circuit that connects the primary and secondary piston chambers and the primary and secondary clamp chambers by hydraulic passages; and a control unit that is connected to the control circuit, the control unit being configured to carry out detecting pressures of the primary and secondary piston chambers; deriving an actual clamp pressure that is actually exerted in the primary and secondary clamp chambers; calculating a difference between the actual clamp pressure and a target clamp pressure when the actual clamp pressure is lower than the target clamp pressure; calculating a thrust that corresponds to the calculated difference; calculating a hydraulic pressure that is needed for producing the calculated thrust; and adding the calculated hydraulic pressure to the pressure of either one of the primary and secondary piston chambers, which shows a lower pressure than the other.

BRIEF DESCRIPTION OF THE DRAWIGS

Other objects and advantages of the present invention will become apparent from the following description when taken in conjunction with the accompanying drawings, in which:

FIG. 13 is a flowchart showing the detail of one step of the flowchart of FIG. 12.

DETAILED DESCRIPTION OF THE EMBODIMENTS

Figure 1:
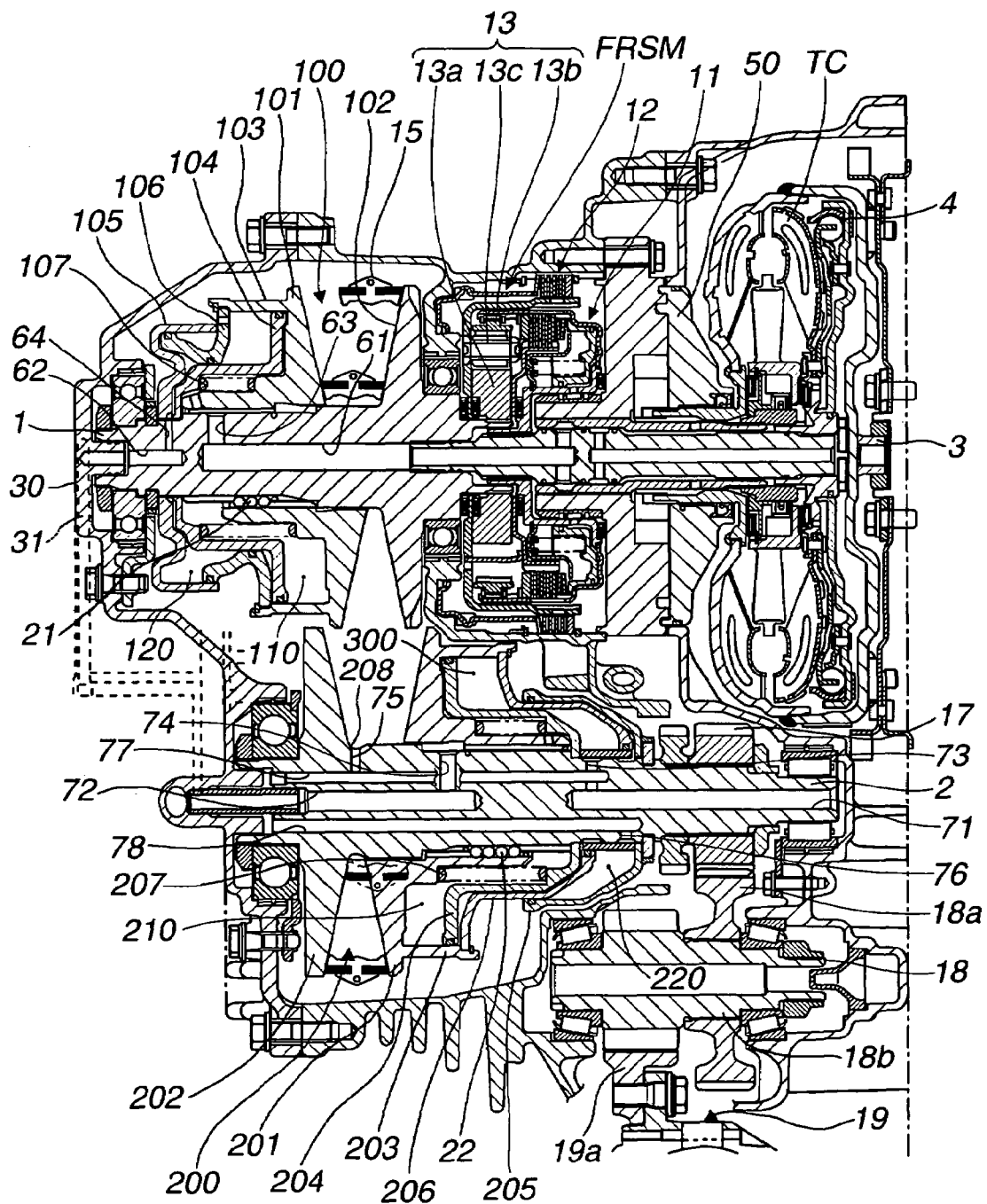
FIG. 1 is a sectional view of a double piston and belt type continuously variable transmission, which is a first embodiment of the present invention.

In the following, embodiments of the present invention will be described in detail with reference to the accompanying drawings.

For ease of understanding, various directional terms such as right, left, upper, lower, rightward and the like are used in the following description. However, such terms are to be understood with respect to only a drawing or drawings on which the corresponding part or portion is shown.

Throughout the specification, substantially same parts and portions are denoted by the same reference numerals and repetitive explanation on them will be omitted for simplification of the description.

Referring to FIG. 1, there is shown a double piston and belt type continuously variable transmission which is a first embodiment of the present invention. For ease of description, the double piston and belt type continuously variable transmission will be called just "belt type CVT" in the following.

As shown in FIG. 1, the belt type CVT comprises a torque converter TC of which input shaft is connected to an output shaft of an engine (not shown). The torque converter TC is operatively connected through an output shaft 3 thereof to a forward/reverse switching mechanism FRSM. The torque converter TC has a lock up clutch 4 through which the output shaft of the engine is directly and selectively connected to an essential transmission unit of the double piston and belt type CVT.

The forward/reverse switching mechanism FRSM generally comprises a forward clutch 11, a reverse brake 12 and a planetary gear unit 13. The planetary gear unit 13 generally comprises a sun gear 13a, a ring gear 13b and a pinion carrier 13. The ring gear 13b is connected to the output shaft 3, and the pinion carrier 13c is connected to the forward clutch 11 and the reverse brake 12.

The reverse brake 12 functions to selectively fix the pinion carrier 13c relative to a transmission case, and the forward clutch 11 functions to selectively connect a primary shaft 1 to the pinion carrier 13c.

As shown, a primary pulley 100 that is a drive member is coaxially arranged on the primary shaft 1 and comprises a primary fixed pulley part 102 fixed to the primary shaft 1 and a primary slidable pulley part 101 rotatable about the primary shaft 1. As shown, these two pulley parts 101 and 102 are coaxially arranged to define therebetween an annular groove having a generally V-shaped cross section. Hereinafter, this groove will be called just "V-shaped pulley groove" for ease of description.

The primary slidable pulley part 101 is disposed about the primary shaft 1 through a ball-spline construction, so that the pulley part 101 is permitted to move axially on and along the primary shaft 1. The primary slidable pulley part 101 is formed with a leftward protruding cylindrical portion 103, while the primary fixed pulley part 102 is integral with the primary shaft 1, as shown.

As shown in FIG. 1, at a left side of the primary slidable pulley part 101, there is arranged a primary first fixed cup-shaped wall 104 that is concentric with the primary shaft 1. Furthermore, at a left side of the primary first fixed cup-shaped wall 104, there is coaxially arranged a primary piston 106. Furthermore, at a left side of the primary piston 106, there is coaxially arranged a primary second fixed cup-shaped wall 105.

The primary first fixed cup-shaped wall 104 is fixed to the primary shaft 1 achieving a hermetical sealing therebetween. The circular outer periphery of the primary first fixed cup-shaped wall 104 slidably contacts a cylindrical inner wall of the cylindrical portion 103 achieving a hermetical sealing therebetween. The primary piston 106 slidably contacts both the cylindrical portion 103 and the primary second fixed cup-shaped wall 105 achieving a hermetical sealing therebetween. The primary second fixed cup-shaped wall 105 is fixed to the primary shaft 1 in a manner to establish a hermetical sealing therebetween.

As shown, the first and second fixed cup-shaped walls 104 and 105 and the primary piston 106 are assembled to constitute two hydraulic work chambers which are a primary piston chamber 110 and a primary clamp chamber 120.

Like the above, a secondary pulley 200 that is a driven member is coaxially arranged on a secondary shaft 2 and comprises a secondary slidable pulley part 201 rotatable about the secondary shaft 2 and a secondary fixed pulley part 202 fixed to the secondary shaft 2. These two pulley parts 201 and 202 are coaxially arranged to define therebetween an annular groove having a generally V-shaped cross section.

An endless belt 15 is put around the primary and secondary pulleys 100 and 200 in a known manner. That is, as is seen from the drawing, the V-shaped grooves of these two pulleys 100 and 200 frictionally hold the belt 15 in a manner to permit a radial shifting of the belt 15 in the grooves.

The secondary slidable pulley part 201 is disposed about the secondary shaft 2 through a ball-spline construction, so that the pulley part 201 is permitted to move axially on and along the secondary shaft 2. The secondary slidable pulley part 201 is formed with a rightward protruding cylindrical portion 203, while the secondary fixed pulley part 202 is integral with the secondary shaft 2, as shown. As shown in FIG. 1, at a right side of the secondary slidable pulley part 201, there is arranged a secondary first fixed cup-shaped wall 204 that is concentric with the secondary shaft 2.

Furthermore, at a right side of the secondary first fixed cup-shaped wall 204, there is coaxially arranged a secondary piston 206. Furthermore, at a right side of the secondary piston 206, there is coaxially arranged a secondary second fixed cup-shaped wall 205.

The secondary first fixed cup-shaped wall 204 is fixed to the secondary shaft 2 achieving a hermetical sealing therebetween. The circular outer periphery of the secondary first fixed cup-shaped wall 204 slidably contacts a cylindrical inner wall of the cylindrical portion 203 achieving a hermetical sealing therebetween. The secondary piston 206 slidably contacts both the cylindrical portion 203 and the secondary second fixed cup-shaped wall 205 achieving a hermetical sealing therebetween. The secondary second fixed cup-shaped wall 205 is fixed to the secondary shaft 2 in a manner to establish a hermetical sealing therebetween.

As shown, the first and second fixed cup-shaped walls 204 and 205 and the secondary piston 206 are assembled to constitute three hydraulic work chambers which are a secondary piston chamber 210, a secondary clamp chamber 220 and a centrifugal canceling chamber 300. As is seen from the drawing, the centrifugal canceling chamber 300 is defined between the secondary piston chamber 210 and the secondary clamp chamber 220.

Within the primary piston chamber 110, there is installed a coil spring 107 that is compressed between the primary slidable pulley part 101 and the primary first fixed cup-shaped wall 104. Due to the biasing force of the coil spring 107, the primary pulley 100 can sufficiently hold the belt 15 even when it is not fed with a hydraulic pressure, such as the time when the associated motor vehicle is being hauled.

Like the above, within the second piston chamber 210, there is installed a coil spring 207 that is compressed between the secondary slidable pulley part 201 and the secondary first fixed cup-shaped wall 204. With this coil spring 207, the secondary pulley 200 can sufficiently hold the belt 15 even when it is not fed with a hydraulic pressure.

The secondary shaft 2 has a drive gear 17 fixed thereto. When the drive gear 17 is rotated, the torque of the same is transmitted through an idler gear 18a, a pinion gear 18b formed on an idler shaft 18, a final gear 19a and a differential unit 19 to drive shafts (not shown) to drive road wheels of the vehicle.

As is understood from the drawing (viz., FIG. 1), by axially moving the primary and secondary slidable pulley parts 101 and 201 on the primary and secondary shafts 1 and 2, the effective radius of each pulley part 101 or 201 is varied, and thus, the rotation speed ratio between the primary and secondary pulleys 100 and 200 is varied continuously.

The control for varying the width of the V-shaped groove of each pulley 100 or 200 is carried out by changing the hydraulic pressure in the primary piston chamber 110 and primary clamp chamber 120 or in the secondary piston chamber 210 and secondary clamp chamber 220.

In the following, hydraulic circuits or passages for the hydraulic work chambers 110, 120, 210 and 220 and the centrifugal canceling chamber 300 will be described in detail with reference to FIGS. 1 and 2.

As is seen from FIG. 1, a side cover 30 is fixed to a left open end of a major casing of the transmission to cover a left end portion of the primary shaft 1. The side cover 30 is formed with a hydraulic passage 31 that is led to a clamp pressure switching valve (viz., CPSV) 40 (see FIG. 2). The primary shaft 1 is formed with hydraulic passages 61, 62, 63 and 64, and the secondary shaft 2 is formed with hydraulic passages 71, 72, 73, 74, 75, 76, 77 and 78. The primary and secondary clamp chambers 120 and 220 are constructed to have the same pressure receiving area.

As shown in FIG. 1, the hydraulic passages 61 and 62 extend in an axial position of the primary shaft 1, while the hydraulic passages 63 and 64 extend radially in the primary shaft 1. The hydraulic passage 61 is connected to the primary piston chamber 110 through the hydraulic passage 63, and the hydraulic passage 62 is connected to the primary clamp chamber 120 through the hydraulic passage 64, and the hydraulic passage 62 is further connected to the above-mentioned hydraulic passage 31.

The hydraulic passages 71 and 72 extend in and along an axial portion of the secondary shaft 2, and the hydraulic passages 73, 74, 75 and 76 extend radially in the secondary shaft 2. The hydraulic passages 77 and 78 extend in the secondary shaft 2 along portions offset from the axis of the secondary shaft 2.

The hydraulic passage 71 is connected to the centrifugal canceling chamber 300 through the hydraulic passage 73, and connected to an oil pump 50 (see FIG. 2) to feed the centrifugal canceling chamber 300 with a pressurized oil. The hydraulic passage 72 is connected to the secondary piston chamber 210 through the hydraulic passage 74. The hydraulic passage 77 is connected to the hydraulic passage 73 and connected to the hydraulic passage 75 that has an end exposed to a bottom portion 208 of the V-shaped groove of the secondary pulley 200 as shown. The hydraulic passage 78 is connected through the hydraulic passage 76 to the secondary clamp chamber 220 and connected to the hydraulic passage 31 formed in the side cover 30.

With the above-mentioned passage arrangement, the primary clamp chamber 120 and the secondary clamp camber 220 are connected to each other through the hydraulic passages 64 and 62 formed in the primary shaft 1, the hydraulic passage 31 formed in the side cover 30 and the hydraulic passages 78 and 76 formed in the secondary shaft 2. Since the two clamp chambers 120 and 220 are arranged to have the same pressure receiving area, these two clamp chambers 120 and 220 can generate the same force and thrust.

Figure 2:
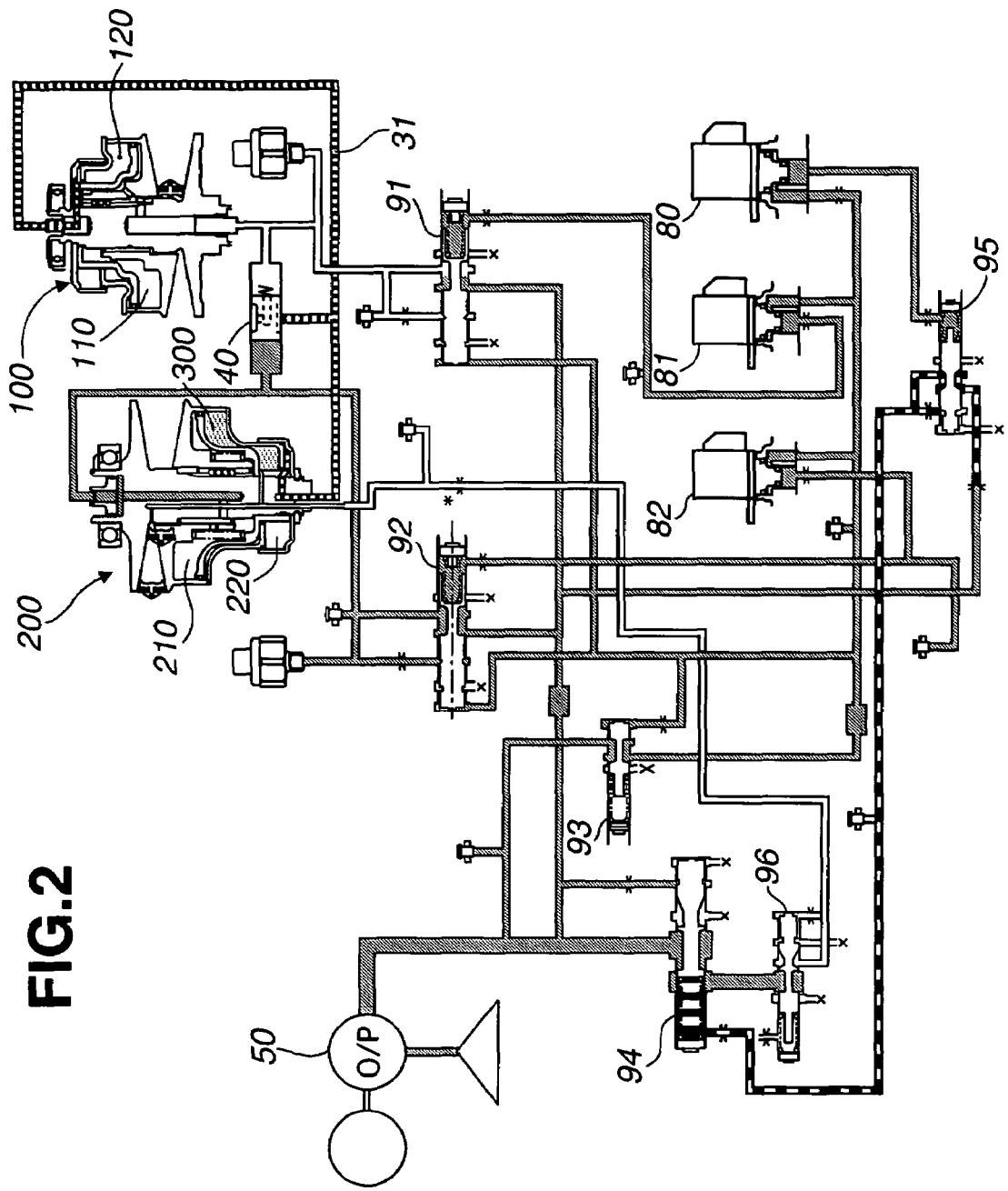
FIG. 2 is a hydraulic circuit for controlling operation of the transmission of the first embodiment of the present invention.

FIG. 2 shows a hydraulic control circuit for the belt type CVT.

As shown, from the oil pump 50, a hydraulic pressure is supplied to a primary pressure reduction valve 91, a secondary pressure reduction valve 92, a pilot valve 93 and a pressure regulator valve 94.

The pilot valve 93 is constructed to feed the primary and secondary pressure reduction valves 91 and 92 and a pressure linear solenoid valve 80, a primary linear solenoid valve 81 and a secondary linear solenoid valve 82, with a constant hydraulic pressure.

The hydraulic pressure outputted from the pressure linear solenoid valve 80 is applied to a pressure modifier valve 95, and the hydraulic pressure outputted from the primary linear solenoid valve 81 is applied to the primary pressure reduction valve 91. Furthermore, the hydraulic pressure outputted from the secondary linear solenoid valve 82 is applied to the secondary pressure reduction valve 92.

The hydraulic pressure outputted from the pressure modifier valve 95 is applied to the pressure regulator valve 94. The drain pressure from the pressure regulator valve 94 is adjusted by a clutch regulator valve 96 and then applied to the centrifugal canceling chamber 300.

The hydraulic pressure outputted from the primary linear solenoid valve 81 is applied to the primary pressure reduction valve 91. The primary pressure reduction valve 91 adjusts the primary pressure based on the pump pressure, the pilot pressure and the solenoid pressure, and feeds the adjusted primary pressure to the primary piston chamber 110.

The hydraulic pressure from the secondary linear solenoid valve 82 is applied to the secondary pressure reduction valve 92. The secondary pressure reduction valve 92 adjusts the secondary pressure based on the pump pressure, the pilot pressure and the solenoid pressure, and feeds the adjusted secondary pressure to the secondary piston chamber 210.

The primary and secondary piston chambers 110 and 210 are connected to each other through the clamp pressure switching valve 40. The clamp pressure switching valve 40 is connected to the hydraulic passage 31 that connects the primary and secondary clamp chambers 120 and 220, and the clamp pressure switching valve 40 functions to feed the clamp chambers 120 and 220 with a higher hydraulic pressure that is exerted in either one of the primary and secondary piston chambers 110 and 210.

Accordingly, each clamp pressure shows one of the primary and secondary pressures that is higher than the other. The clamp chambers 120 and 220 are constantly connected to each other through the hydraulic passage 31 and have the same pressure receiving area. Thus, even when the pressure in the primary chamber and that in the secondary chamber are changed, the volume change of each clamp chamber 120 or 220 is suppressed.

If the pressure receiving area of the piston chambers 110 and 210 and that of the clamp chambers 120 and 220 are indicated by "Ap", "As" and "Ac", if the respective operating pressures of the piston chambers 110 and 210 are indicated by "Pp" and "Ps" and if the clamp pressure is indicated by "Pc", the thrust "Fp" applied to the primary slidable pulley part 101 and the thrust "Fs" applied to the secondary slidable pulley part 201 are represented by the following equations:

$$Fp = Ap \times Pp + Ac \times Pc \quad (1)$$

$$Fs = As \times Ps + Ac \times Pc \quad (2)$$

When now the secondary operating pressure shows a higher value, the clamp pressure switching valve 40 functions to feed the primary and secondary clamp chambers 120 and 220 with the secondary side pressure "Ps" inducing establishment of the relation "Pc=Ps". Accordingly, in this case, the thrust "Fp" of the primary pulley 100 and the thrust "Fs" of the secondary pulley 200 are represented by the following equations:

$$Fp = Ap \times Pp + Ac \times Ps \quad (3)$$

$$Fs = As \times Ps + Ac \times Ps \quad (4)$$

That is, in accordance with the thrusts "Fp" and "Fs", the slidable pulley parts 101 and 201 are slid carrying out the speed change.

Figure 3:
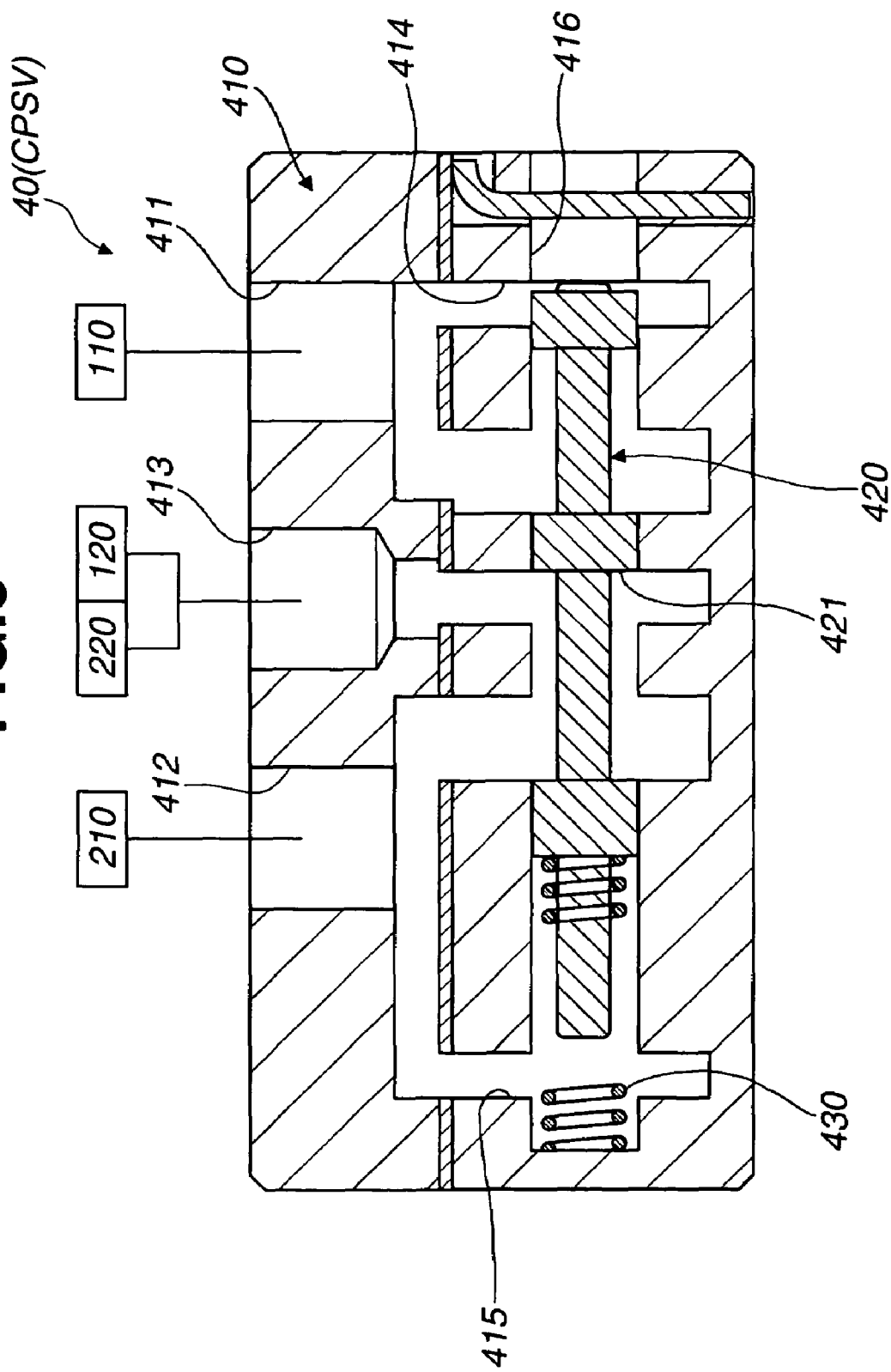
FIG. 3 is an enlarged sectional view of a clamp pressure switching valve employed in the first embodiment of the present invention.

FIG. 3 shows the detail of the clamp pressure switching valve 40. The clamp pressure switching valve 40 comprises a valve body 410 that has hydraulic passages formed therein, and a spool 420 that is axially movable received in the valve body 410 to carry out ON/OFF operation of the hydraulic passages.

As shown, in the valve body 410, there are formed a primary port 411, a clamp port 413 and a secondary port 412, which are connected to the primary piston chamber 110, the primary and secondary clamp chambers 120 and 220 and the secondary piston chamber 210 respectively. The primary and secondary ports 411 and 412 are formed with feedback circuits 414 and 415 for suppressing sticking of the spool 420.

The spool 420 is axially movably received in a spool bore 416 formed in the valve body 410 and biased rightward in the drawing by a biasing spring 430 installed in the secondary feedback circuit 415. When the primary pressure "Pp" and the secondary pressure "Ps" show the same level, the primary port 411 and the clamp port 413 are disconnected by a land 421 of the spool 420.

When the primary pressure "Pp" is lower than the sum of the secondary pressure "Ps" and the biasing force of the biasing spring 430, the spool 420 assumes a right position where the primary port 411 and the clamp port 413 are disconnected.

Accordingly, under such condition, the clamp port 413 is fed with the secondary pressure "Ps", and thus the clamp pressure "Pc" in the clamp chambers 120 and 220 shows the secondary pressure "Ps".

While, when the primary pressure "Ps" is higher than the sum of the secondary pressure "Ps" and the biasing force of the biasing spring 430, the spool 420 assumes a left position where the primary port 411 and the clamp port 413 are connected. Accordingly, under such condition, the secondary port 412 and the clamp port 413 are disconnected by the land 421, and thus the clamp chambers 120 and 220 are fed with the primary pressure "Pp". Thus, under this condition, the clamp pressure "Pc" is equal to the primary pressure "Pp".

It is to be noted that when the primary pressure "Pp" is higher than the secondary pressure "Ps" even by a small degree, the spool 420 is allowed to move axially for inducing the equality between the clamp pressure "Pc" and the primary pressure "Pp". This is achieved by setting the biasing spring 430 to produce only a small biasing force. Thus, in the first embodiment of the present invention, by the clamp pressure switching valve 40, higher one of the primary pressure "Pp" and the secondary pressure "Ps" is selected to serve as the clamp pressure "Pc".

When, like in case wherein the engine is stopped, the primary pressure "Pp" and the secondary pressure "Ps" show the same pressure, the primary port 411 and the clamp port 413 are closed thereby to induce equality between the secondary pressure "Ps" and the clamp pressure "Pc". In a lower speed change ratio, the primary pulley radius "Rp" is smaller than the secondary pulley radius "Rs", and upon starting of the vehicle, increase of the secondary thrust "Fs" is instantly needed. However, in order to avoid undesired slippage of the belt that would take place due to instant increase of the secondary pressure "Ps" for the secondary thrust "Fs", the clamp pressure "Pc" should be also increased simultaneously.

In the first embodiment of the present invention, the secondary pressure "Ps" is equal to the clamp pressure "Pc" under a normal condition. Accordingly, when the secondary pressure "Ps" is increased, the clamp pressure "Pc" is also increased. This means that in case wherein, due to starting of the vehicle, the secondary pressure "Ps" is rapidly increased, the clamp pressure "Pc" can be instantly increased, and thus, the rising of the driving force is smoothly carried out without suffering from undesired belt slippage.

In the above-mentioned first embodiment, the spool 420 is biased rightward in FIG. 3 by the biasing spring 430. However, if desired, the spring 430 may be removed if the spool 420 is so constructed that the pressure receiving area for the primary pressure "Pp" is larger than that for the secondary pressure "Ps". That is, when, in such construction, the primary pressure "Pp" and the secondary pressure "Ps" are equal, the spool 420 is biased rightward.

Figure 4:
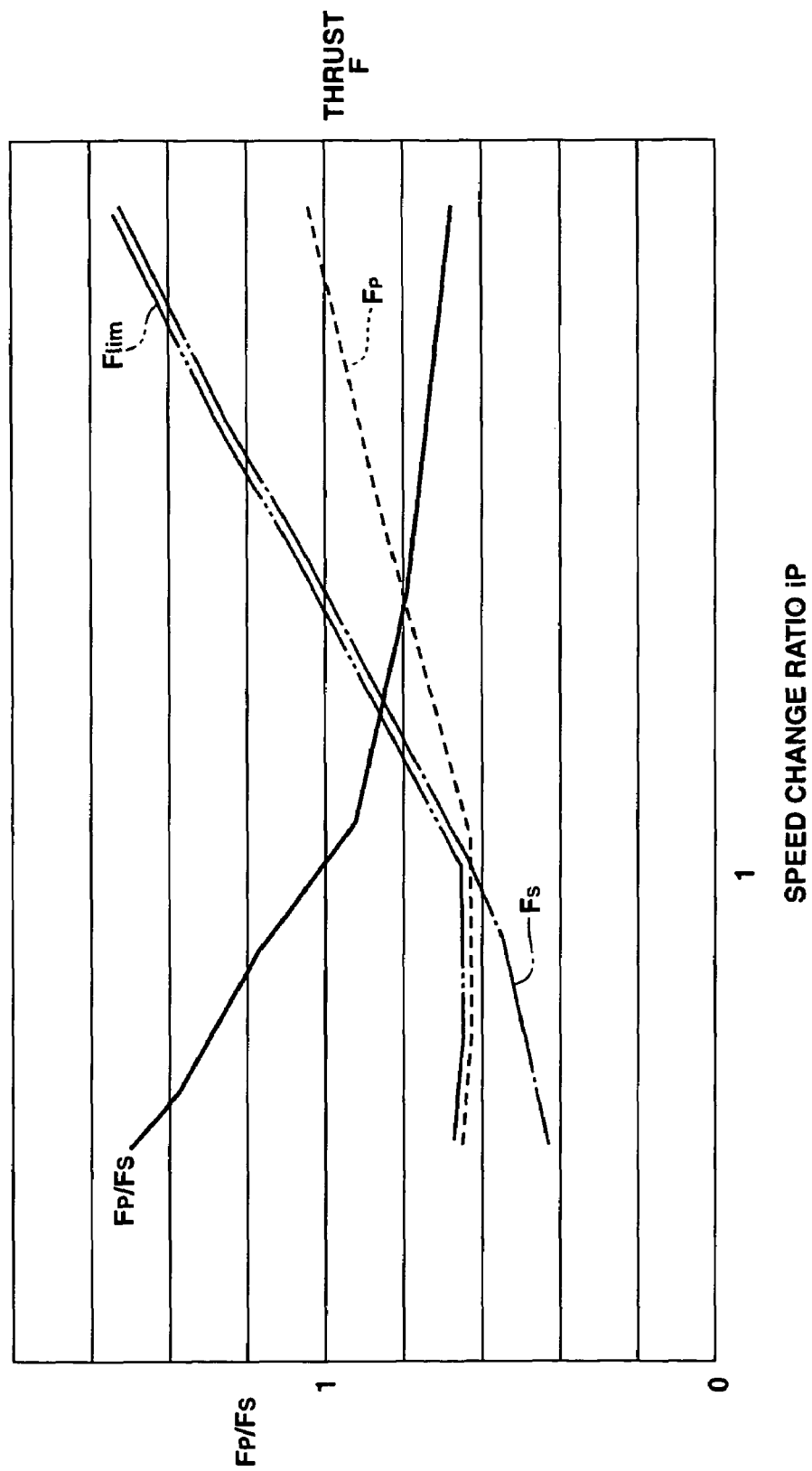
FIG. 4 is a graph showing respective thrusts produced by primary and secondary pulleys and a ratio between these thrusts in view of a speed change ratio of the transmission of the first embodiment.

FIG. 4 is a graph showing a relationship between the speed change ratio "ip" of the transmission of the first embodiment and pulley driving forces (or thrusts) "Fp" and "Fs" (viz., lower limit of the thrust that avoids the belt slippage). As shown, the X-axis shows the speed change ratio "ip" and the Y-axis shows the thrust "F" and the value of "Fp/Fs". The ratio "Fp/Fs" is indicated by a solid line, the primary thrust "Fp" is by a dashed line, the secondary thrust "Fs" is by an alternate long and short dash line, and the lower limit thrust "Flim" is by an alternate long and two short dashes line.

As shown, when the speed change ratio "ip" is smaller than 1 (one), the primary thrust "Fp" is larger than the secondary thrust "Fs". However, at around 1 (one) of the speed change ratio "ip", the larger/smaller relation between the primary thrust "Fp" and the secondary thrust "Fs" is reversed, and when the speed change ratio "ip" is larger than 1 (one), the secondary thrust "Fs" becomes larger than the primary thrust "Fp". That is, in order to avoid the belt slippage, the actual thrust of each pulley should be larger than the lower limit thrust "Flim" that is indicated by the alternate long and two short dashes line. In order to effectively save or reduce the hydraulic pressure and effectively save or reduce the energy needed for operating the pump, it is desirable to reduce the pulley thrusts "Fp" and "Fs" as small as possible.

In the first embodiment, due to provision of the clamp pressure switching valve 40, a higher pressure is selected between the primary pressure "Pp" and the secondary pressure "Ps", and the selected higher pressure serves as the clamp pressure "Pc". Accordingly, the clamp pressure "Pc" can be constantly set to a value that corresponds to the lower limit thrust "Flim". This means that the belt can be clamped by a minimum hydraulic pressure and thus the load of the pump is reduced.

In the above-mentioned known double piston and belt type continuously variable transmission such as one as shown in Japanese Laid-open Patent Application (Tokkai) 2002-327814, there is employed a pressure control valve that adjusts the pressure in the primary and secondary clamp chambers. However, for compensating a pressure drop inevitably caused at the time of pressure adjusting, the pump output has to be increased to a marked level, which brings about a poor fuel consumption of an associated engine.

While, in the first embodiment of the present invention, due to employment of the clamp pressure switching valve 40, the higher pressure in either one of the primary pressure "Pp" and secondary pressure "Ps" is selected and the selected higher pressure is used as the clamp pressure "Pc" that corresponds to the lower limit thrust "Flim". Accordingly, the undesired belt slippage can be avoided without increasing the load applied to the oil pump, and thus fuel consumption of the associated engine can be reduced.

The primary clamp chamber 120 and the secondary clamp chamber 220 are constantly connected through the hydraulic passage 31. Furthermore, these two clamp chambers 120 and 220 have the same pressure receiving area. Accordingly, even when the higher/lower relation in pressure between the primary and secondary clamp chambers 120 and 220 is changed, the volume change of each clamp chamber 120 or 220 can be suppressed or at least minimized, which brings about a smoothed speed change.

Furthermore, in case wherein, due to a standstill of the engine, the primary pressure "Pp" and the secondary pressure "Ps" show the same value, the primary port 411 and the clamp port 413 are closed inducing equality between the secondary pressure "Ps" and the clamp pressure "Pc". In a lower speed change ratio, the primary pulley effective diameter "Rp" is smaller than the secondary pulley effective diameter "Rs", and upon need of starting the vehicle, it is necessary to instantly increase the secondary thrust "Fs". For avoiding the undesired belt slippage that would be induced by the instant increase of the secondary thrust "Fs", the clamp pressure "Pc" should be also increased at the same time.

In the first embodiment of the present invention, the clamp pressure switching valve 40 is so set that in a normal condition, the secondary pressure "Ps" is used as the clamp pressure "Pc". Accordingly, upon increase of the secondary pressure "Ps", the clamp pressure "Pc" is instantly increased. Accordingly, when, upon starting the vehicle, the secondary thrust "Fs" is instantly increased, the clamp pressure "Pc" can be instantly increased to avoid the undesired slippage of the belt.

In the clamp pressure switching valve 40, the biasing spring 430 is employed that biases in a normal condition the spool 420 to the position to connect the secondary port 412 to the clamp port 413. Accordingly, in the normal condition, movement of the spool 420 is not induced and thus the transmission of the secondary pressure "Ps" to the primary and secondary clamp chambers 120 and 220 is instantly and assuredly carried out, which means a smoothed speed change operation of the transmission.

In the following, a second embodiment of the present invention will be described in detail with reference to the accompanying drawings.

As will become apparent as the description proceeds, the second embodiment is based on the above-mentioned first embodiment and provided with a pressure control circuit that controls the pressures in the primary and secondary piston chambers as well as the pressure in the primary and secondary clamp chambers with the aid of a control unit.

That is, in the above-mentioned first embodiment, for obtaining a differential thrust (see FIG. 6A) at the time of speed changing, a reduction in pressure of one of the primary and secondary piston chambers, that shows a lower pressure than the other, inevitably occurs. (In the example of FIG. 6A, the pressure reduction is shown in the pressure of the primary piston chamber.) If, in this case, the higher pressure in the secondary piston chamber fails to increase to a sufficiently high level, the lower pressure in the primary piston chamber becomes lowered beyond the belt slippage prevention level. In this case, undesired belt slippage tends to occur.

Figure 5:
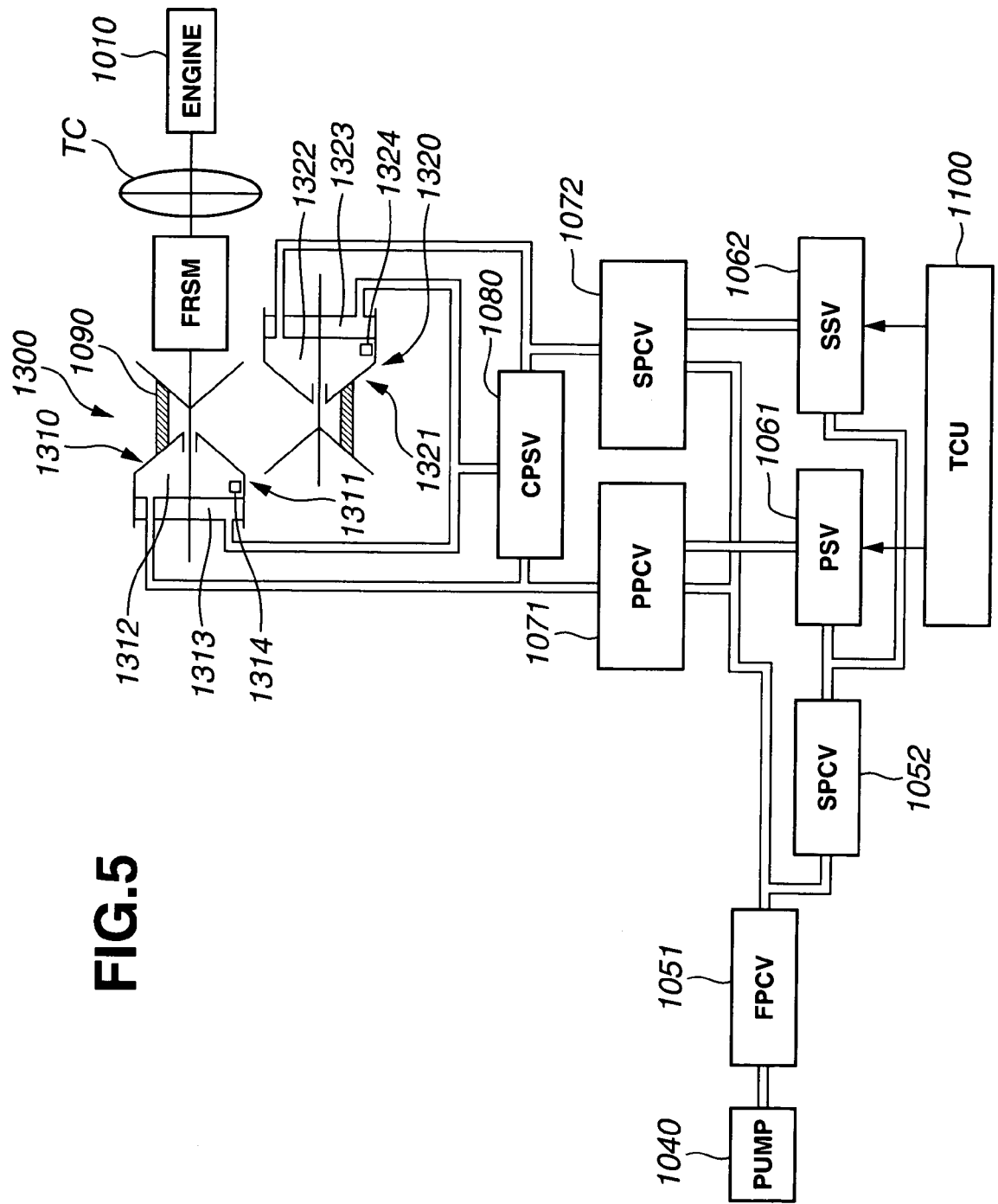
FIG. 5 is a block diagram of a double piston and belt type continuously variable transmission of a second embodiment of the present invention.

Referring to FIG. 5, there is schematically shown a double piston and belt type continuously variable transmission which is the second embodiment of the present invention. This second embodiment is free of the above-mentioned shortcoming of the first embodiment.

In FIG. 5, denoted by numeral 1010 is an automotive engine, such as an internal combustion engine. The output of the engine 1010 is transmitted through a torque converter TC and a forward/reverse switching mechanism FRSM to an essential transmission unit 1300 of the double piston and belt type CVT.

The CVT generally comprises a primary pulley 1310 that is a drive pulley, a secondary pulley 1320 that is a driven pulley and an endless belt 1090 that is operatively put around the primary and secondary pulleys 1310 and 1320.

The primary pulley 1310 is provided with a primary piston chamber 1312 that generates a thrust used for the speed changing and a primary clamp chamber 1313 that generates a thrust used for suppressing a belt slippage. Like the primary pulley 1310, the secondary pulley 1320 is provided with a secondary piston chamber 1322 and a secondary clamp chamber 1323.

The thrust of each pulley 1310 or 1320 is a resultant of the thrust based on a hydraulic pressure in the piston chamber 1312 or 1322 and the thrust based on a hydraulic pressure in the clamp chamber 1313 or 1323. That is, the thrust of the primary pulley 1310 is applied to a primary slidable pulley part 1311 to slide the same varying the effective radius of the primary pulley 1310. The thrust of the secondary pulley 1320 is applied to a secondary slidable pulley part 1321 to slide the same varying the effective radius of the secondary pulley 1320. Due to the change of the effective radius of each pulley 1310 or 1320, the speed change of the transmission is carried out, as is known.

As shown, the primary and secondary piston chambers 1312 are 1322 are respectively connected to both a primary pressure control valve (viz., PPCV) 1071 and a secondary pressure control valve (viz., SPCV) 1072.

The primary clamp chamber 1313 and the secondary clamp chamber 1323 are constantly connected to each other, and connected to a clamp pressure switching valve (viz., CPSV) 1080. As shown, the clamp pressure switching valve 1080 is connected to both the primary and secondary pressure control valves 1071 and 1072 and functions to feed both the primary and secondary clamp chambers 1313 and 1323 with a higher one between a pressure exerted in the primary piston chamber 1312 and a pressure exerted in the secondary piston chamber 1322. That is, the clamp pressure switching valve 1080 selects the higher pressure mechanically. That is, the selected higher pressure of the primary and secondary piston chambers 1312 and 1322 is used as a clamp pressure.

As is described hereinabove, also in this second embodiment, the higher one of the pressures in the primary and secondary piston chambers 1312 and 1322 is led to the primary and secondary clamp chambers 1313 and 1323.

As shown, the primary and secondary piston chambers 1312 and 1322 are equipped with primary and secondary pressure sensors 1314 and 1324 for sensing the hydraulic pressure exerted therein. Actually, these sensors 1314 and 1324 are received in circuits respectively connected to the primary and secondary piston chambers 1312 and 1322. By comparing information signals issued from the sensors 1314 and 1324, the higher pressure is detected or selected. If desired, either one of the primary and secondary clamp chambers 1313 and 1323 may be equipped with a pressure sensor for detecting an actual clamp pressure "Pcl". It is now to be noted that the higher pressure in either one of the primary and secondary piston chambers 1312 and 1322 serves as the actual clamp pressure "Pcl" due to the work of the clamp pressure switching valve 1080.

Denoted by numeral 1040 is an oil pump that feeds the primary and secondary pressure control valves 1071 and 1072 with a compressed oil through a first pressure control valve (viz., FPCV) 1051, and feed primary and secondary solenoid valves 1061 and 1062 with the compressed oil through the first pressure control valve 1051 and a second pressure control valve (viz., SPCV) 1052. As shown, the primary and secondary solenoid valves (viz., PSV and SSV) 1061 and 1062 are controlled by a transmission control unit (TCU) 1100. Upon receiving an instruction signal from the control unit 1100, the primary and secondary solenoid valves 1061 and 1062 feed the primary and secondary pressure control valves 1071 and 1072 with respective signal pressures.

As is seen from the drawing, the hydraulic pressure outputted from the oil pump 1040 is adjusted by the first pressure control valve 1051 to produce a line pressure that is led to the primary and secondary pressure control valves 1071 and 1072. The line pressure from the first pressure control valve 1051 is adjusted by the second pressure control valve 1052 to produce a pilot pressure that is led to the primary and secondary solenoid valves 1061 and 1062. The control unit 1100 controls the primary and secondary solenoid valves 1061 and 1062 to reform the pilot pressure to desired signal pressures that are led to the primary and secondary pressure control valves 1071 and 1072.

Based on the desired signal pressures fed thereto, the primary and secondary pressure control valves 1071 and 1072 adjust the line pressure to produce adjusted pressures that are respectively led to the primary and secondary piston chambers 1312 and 1322. The pressures adjusted by the primary and secondary pressure control valves 1071 and 1072 are applied to the clamp pressure switching valve 1080. By this valve 1080, higher one of the two pressures from the valves 1071 and 1072 is selected and led to the primary and secondary clamp chambers 1313 and 1323.

If the pressure receiving area of the piston chambers 1312 and 1322 and that of the clamp chambers 1313 and 1323 are shown by "Ap", "As" and "Acl", if the hydraulic pressures in the piston chambers 1312 and 1322 are shown by "Pp" and "Ps" and if the clamp pressure is shown by "Pcl", the thrust "Fp" applied to the primary slidable pulley part 1311 and the thrust "Fs" applied to the secondary slidable pulley part 1323 are represented by the following equations:

$$Fp = Ap \times Pp + Ac \times Pcl \tag{5}$$

$$Fs = As \times Ps + Ac \times Pcl \tag{6}$$

If now the secondary piston chamber pressure "Ps" shows a higher value, the clamp pressure switching valve 1080 functions to feed the primary and secondary clamp chambers 1313 and 1323 with the pressure "Ps" inducing establishment of the relation "Pcl=Ps". Accordingly, in this case, the thrust "Fp" of the primary pulley 1310 and the thrust "Fs" of the secondary pulley 1320 are represented by the following equations:

$$Fp = Ap \times Pp + Acl \times Ps \tag{7}$$

$$Fs = As \times Ps + Acl \times Ps \tag{8}$$

That is, in accordance with the thrusts "Fp" and "Fs", the slidable pulley parts 1311 and 1321 are slid carrying out the speed change.

Target hydraulic pressure is represented by the following equation:

$$P^*s = P^*cl \tag{9}$$

If the hydraulic pressure in the primary piston chamber is higher than that of the secondary piston chamber, the clamp pressure "Pc" is equal to "Pp". In this case, the target hydraulic pressure is represented by the following equation:

$$P^*p = P^*cl \tag{10}$$

Figure 6A:
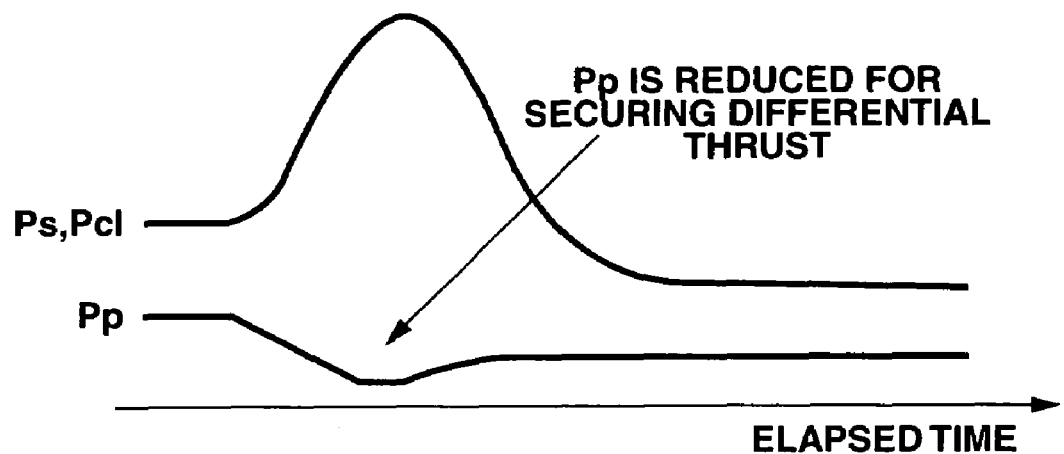
FIGS. 6A and 6B are graphs showing respectively a change of pressure and a change of thrust in case of a primary piston chamber and a secondary piston chamber (viz., clamp chamber in the illustrated case), depicting in FIG. 6A a reduction in pressure of the primary piston chamber, that is inevitably induced under speed change operation of the transmission.
Figure 6B:
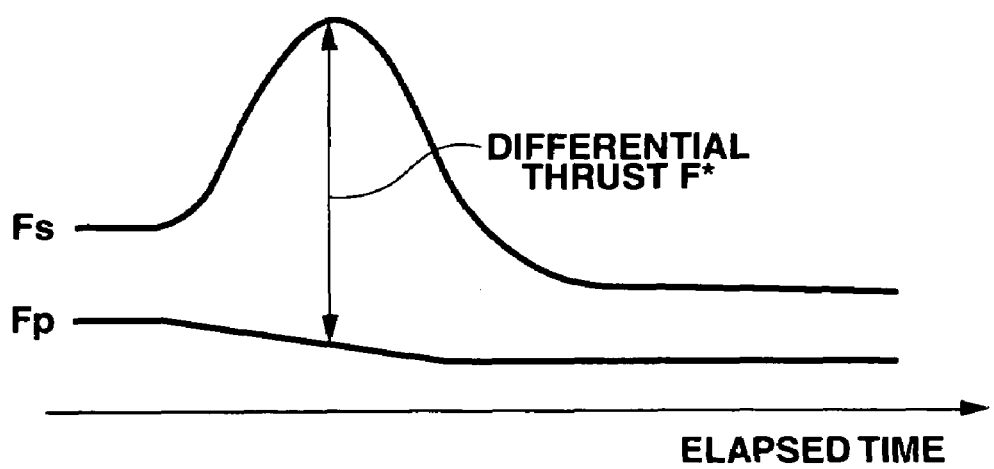

FIGS. 6A and 6B show respectively a change of the pressures "Pp", "Ps" and "Pcl" and a change of the thrusts "Fp" and "Fs" relative to elapsed time, depicting in FIG. 6A a reduction in pressure of the primary piston chamber, that is inevitably induced under speed change operation of the transmission.

Figure 7A:
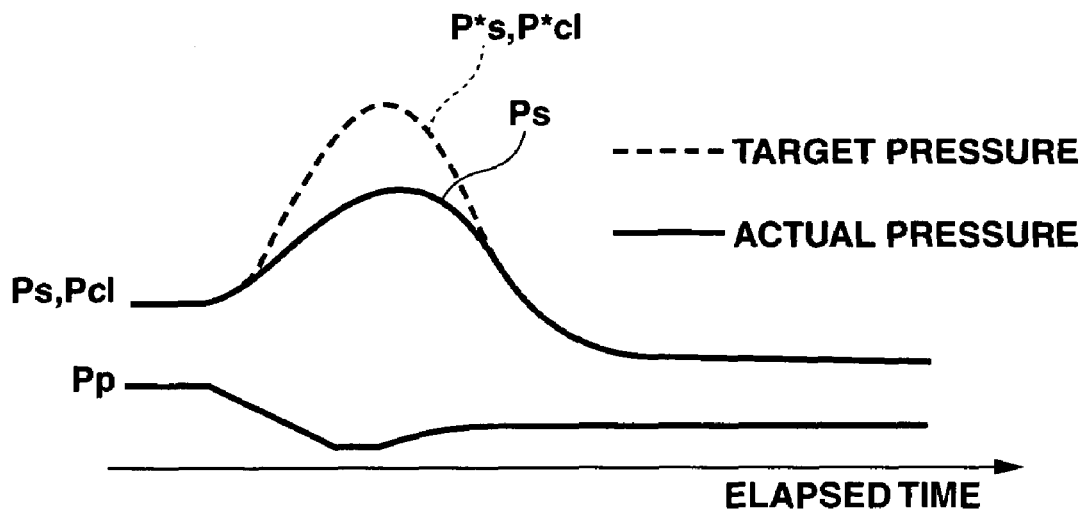
FIGS. 7A and 7B are graphs similar to FIGS. 6A and 6B, but showing a case wherein the pressure in the secondary piston chamber fails to reach its target pressure.
Figure 7B:
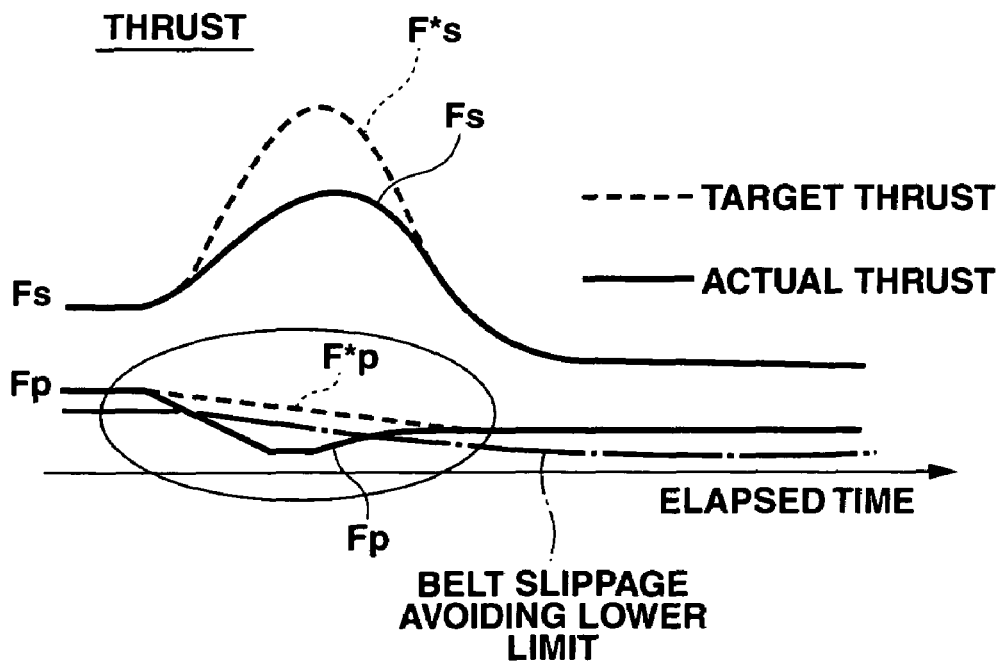

While, FIGS. 7A and 7B show respectively a change of the pressures "Pp", "Ps" and "Pcl" and a change of the thrusts "Fp" and "Fs" relative to the elapsed time, in case wherein the secondary piston chamber pressure fails to reach its target pressure. That is, in this case, due to a poor responsibility of the hydraulic pressure, the actual secondary pressure (viz., actual secondary piston chamber pressure) "Ps" fails to reach a target secondary pressure "P*s". In the example of FIG. 7A, the secondary piston chamber pressure "Ps" is higher than the primary piston chamber pressure "Pp", and thus the secondary piston chamber pressure "Ps" is used as the clamp pressure "Pcl".

When, as is seen from FIG. 7A, the secondary piston chamber pressure "Ps" fails to reach the target value "P*s" due to the hydraulic pressure responsibility limit, also the clamp pressure "Pcl" fails to increase to a target value. Accordingly, in such case, as is seen from FIG. 7B, the thrust "Fp" produced by the clamp pressure for the primary pulley 1310 is lowered to a value that is lower than the belt slippage suppression value, which tends to induce the undesired belt slippage at the primary pulley 1310.

Figure 8A:
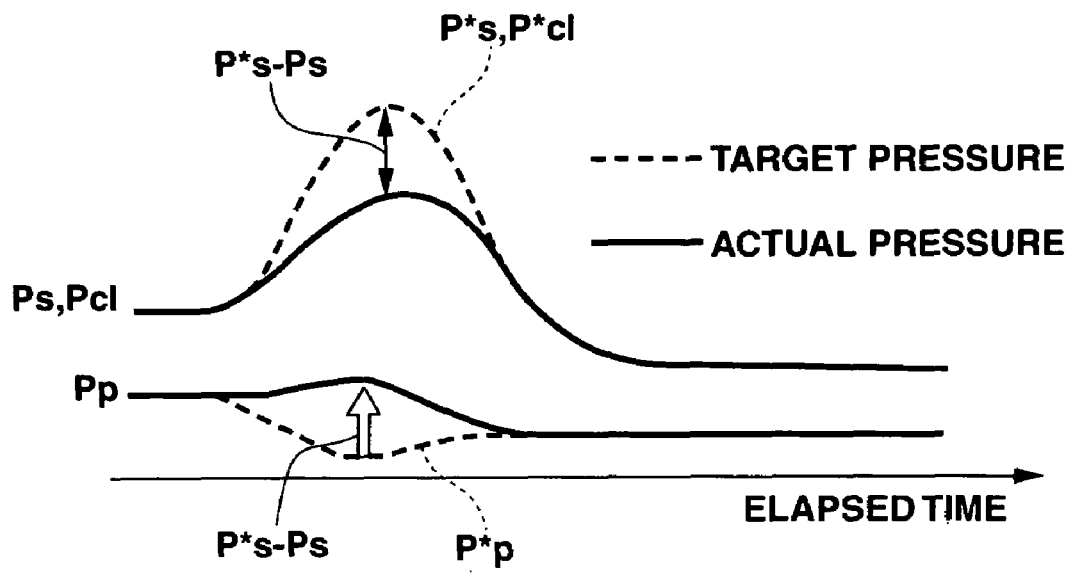
FIGS. 8A and 8B are graphs similar to FIGS. 7A and 7B, but showing a case wherein a correction is made for compensating the pressure reduction of the primary piston chamber pressure.
Figure 8B:
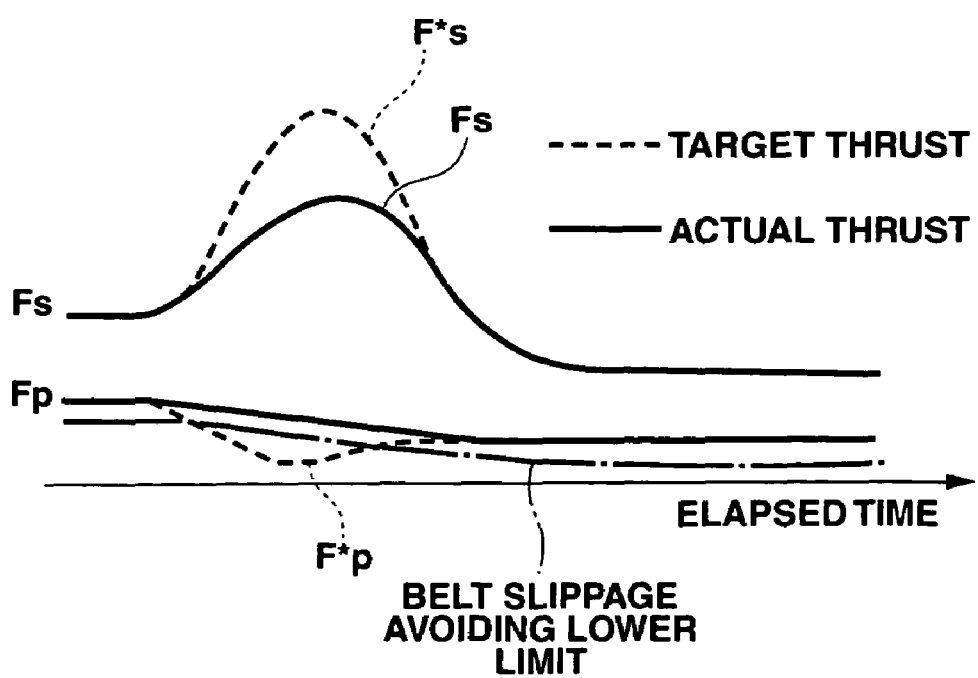

FIGS. 8A and 8B show respectively a change of the pressures "Pp", "Ps" and "Pcl" and a change of the thrusts "Fp" and "Fs" relative to the elapsed time in a case of the second embodiment of the invention wherein for avoiding the belt slippage, a correction of the hydraulic pressure is carried out.

That is, as shown in FIG. 8A, in the second embodiment, when, due to the poor responsibility of the hydraulic pressure, the actual secondary piston chamber pressure "Ps" fails to reach the target hydraulic pressure "P*s", the following operation is carried out for eliminating the above-mentioned drawback.

That is, first, a comparison between the target clamp pressure "P*cl" and the actual clamp pressure "Pcl" is carried out. And, if the actual clamp pressure "Pcl" is found lower than the target clamp pressure "P*cl", the following calculation is carried out to derive a difference ΔPcl between the target clamp pressure "P*cl" and the actual clamp pressure "Pcl":

$$\Delta Pcl = P^*cl - Pcl \quad (11)$$

Based on this difference "ΔPcl", a difference corresponding thrust "ΔF" is calculated from the following equation:

$$\Delta F = Acl \times \Delta P \quad (12)$$

In this case, the actual secondary pressure "Ps" that is the higher pressure is used as the actual clamp pressure, the equality of "Pcl=Ps" is established.

A hydraulic pressure "ΔPp" that corresponds to the thrust "ΔF" is added to the target hydraulic pressure of the lower pressure side and a primary side corrected hydraulic pressure "Ppmin" is calculated. Because of the relation of the pressure receiving area, the following equation is established:

$$\Delta Pp = Acl/Ap(P^*s - Ps) \quad (13)$$

The primary side corrected hydraulic pressure "Ppmin" is set to a final target hydraulic pressure "Ppt" of the primary side.

In the secondary side, the target secondary piston chamber pressure "P*s" is set to a final target secondary piston chamber pressure "Pst".

The above-mentioned control is directed to a case wherein the actual secondary piston chamber pressure "Ps" is higher than the actual primary piston chamber pressure "Pp" and thus the target secondary piston chamber pressure "P*s" is used as the target clamp pressure "P*cl".

However, such control is evenly carried out in substantially the same manner in a case wherein the actual primary piston chamber pressure "Pp" is higher than the actually secondary piston chamber pressure "Ps" and thus the target primary piston chamber pressure "P*p" is used as the target clamp pressure "P*cl".

Figure 9A:
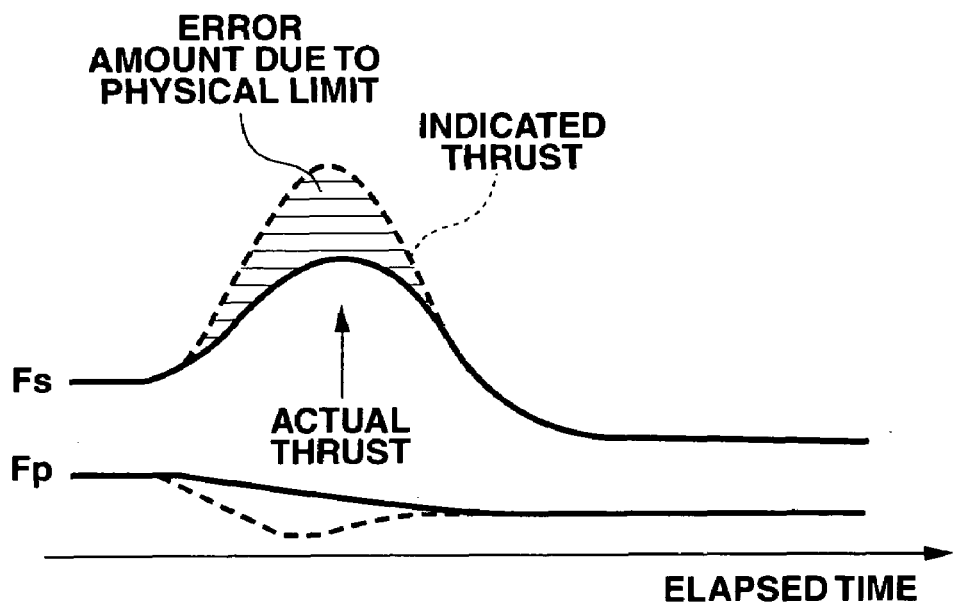
FIGS. 9A and 9B are graph similar to FIGS. 8A and 8B, but showing a case wherein due to a physical limitation or the like, the actual secondary piston chamber fails to reach a secondary piston chamber pressure.
Figure 9B:
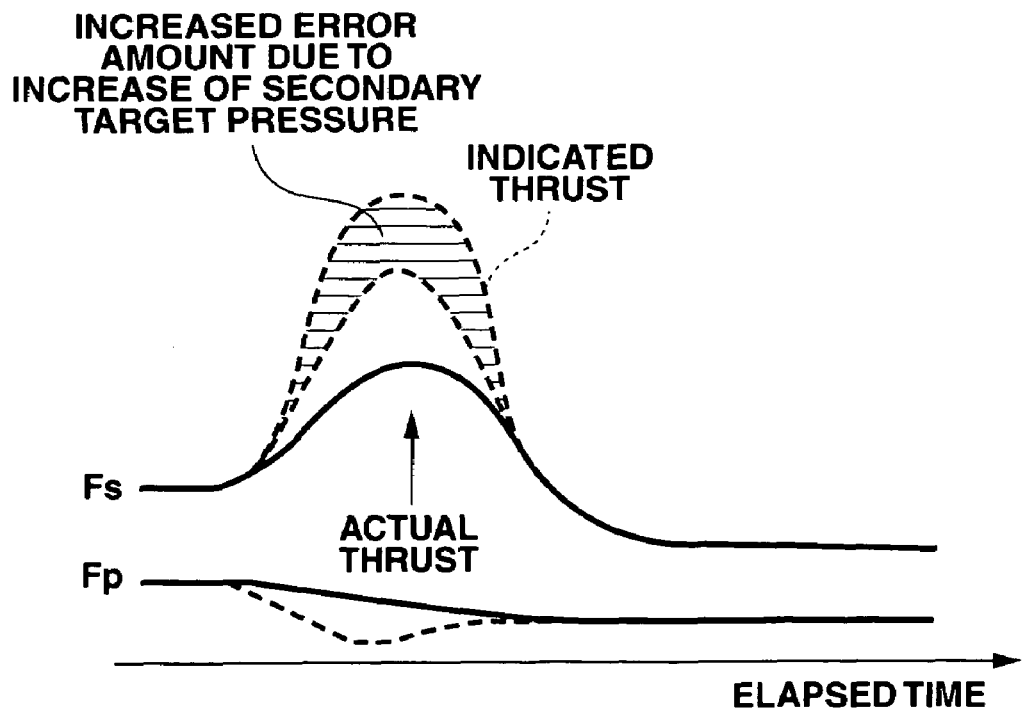

FIGS. 9A and 9B show a change of the thrusts "Fp" and "Fs" relative to the elapsed time in a case wherein due to a physical limitation or the like, the actual secondary piston chamber pressure "Ps" fails to reach the target secondary piston chamber pressure "P*s". In the illustrated case, the secondary side shows a higher pressure.

That is, due to the physical limitation, such as the poor responsibility of the hydraulic pressure or the like, it tends to occur that the actual secondary piston chamber pressure "Ps" fails to reach the target secondary piston chamber pressure "P*s". In such case, a control error is increased. If, in such case, a feedback control for the target secondary piston chamber pressure "P*s" is carried out by means of PI control, undesirable hunting phenomenon tends to occur due to the increased control error.

However, in the second embodiment of the present invention, as is seen from the graph of FIGS. 9A and 9B, even when the actual secondary piston chamber pressure "Ps" fails to reach the target secondary piston chamber pressure "P*s", the control is processed by using the actual secondary piston chamber pressure "Ps" as a final target pressure without respect to the target secondary piston chamber pressure "P*s". Accordingly, there is no need of uselessly increasing the higher target secondary pressure "P*s", and thus the undesirable hunting is avoided.

In the following, the control for suppressing or at least minimizing the undesired belt slippage will be described in detail with reference to the drawings.

Figure 10:
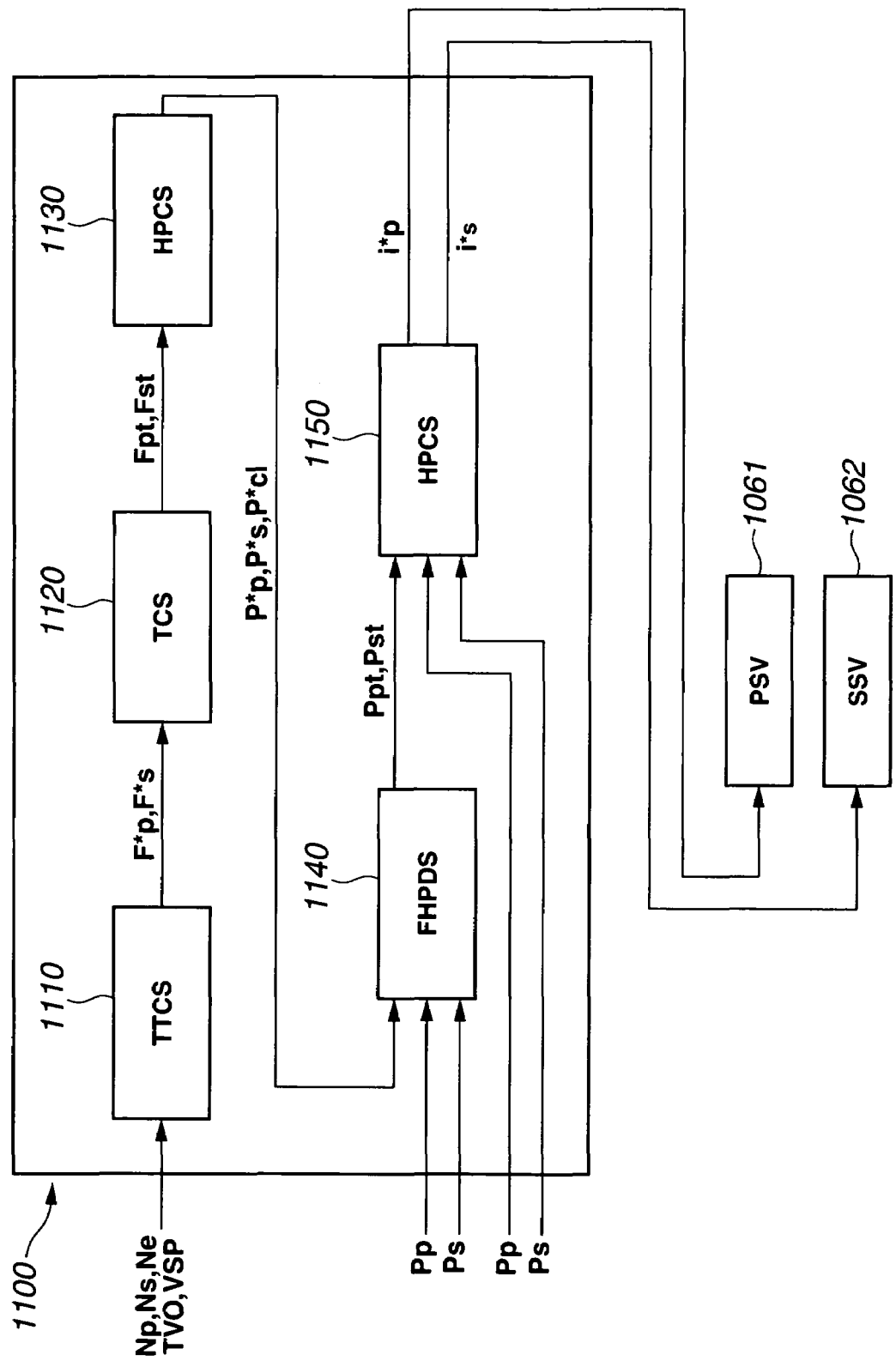
FIG. 10 is a block diagram of a transmission control unit employed in the second embodiment.

FIG. 10 is a block diagram of the transmission control unit 1100. As shown, the control unit 1100 generally comprises a target thrust calculating section (TTCS) 1110, a thrust correction section (TCS) 1120, a hydraulic pressure converting section (HPCS) 1130, a final hydraulic pressure determining section (FHPDS) 1140 and a hydraulic pressure command section (HPCS) 1150.

Into the TTCS 1110, there are fed various information signals which are a signal "Np" that represents the rotation speed of the primary pulley 1310, a signal "Ns" that represents the rotation speed of the secondary pulley 1320, a signal "Ne" that represents the rotation speed of the engine, a signal "TVO" that represents an open degree of a throttle valve of the engine, and a signal "VSP" that represents the speed of the motor vehicle.

By processing the information signals "Np", "Ns", "Ne", "TVO" and "VSP", the TTCS 1110 calculate target thrusts "F*p" and "F*s" for the primary and secondary pulleys 1310 and 1320. The calculated target thrusts "F*p" and "F*s" are led to the TCS 1120.

In the TCS 1120, centrifugal hydraulic pressures of the primary and secondary pulleys 1310 and 1320 are calculated based on the rotation speeds "Np" and "Ns" of the pulleys, and the target thrusts "F*p" and "F*s" from the TTCS 1110 are processed to produce corrected values "Fpt" and "Fst" based on both the calculated centrifugal hydraulic pressures and the resilient forces of biasing springs for the pulleys. The corrected values "Fpt" and "Fst" of the target thrusts are led to the HPCS 1130.

In the HPCS 1130, based on the corrected values "Fpt" and "Fst", target piston pressures "P*p" and "P*s" for the piston chambers 1311 and 1321 and target clamp pressure "P*cl" for the clamp chambers 1313 and 1323 are calculated. These calculated target pressures "P*p", "P*s" and "P*cl" are led to the FHPDS 1140.

In the FHPDS 1140, based on actual pulley pressures "Pp" and "Ps" of the primary and secondary piston chambers 1312 and 1322, the target pressures "P*p" and "P*s" are corrected to produce final target pressures "Ppt" and "Pst" that avoid the belt slippage. The final target pressures "Ppt" and "Pst" are led to the HPCS 1150.

In the HPCS 1150, based on the actual pulley pressures "Pp" and "Ps", the final target pressures "Ppt" and "Pst" are subjected to a feedback control to produce control currents "i*p" and "i*s" for the primary and secondary solenoid valves 1061 and 1062.

Figure 11:
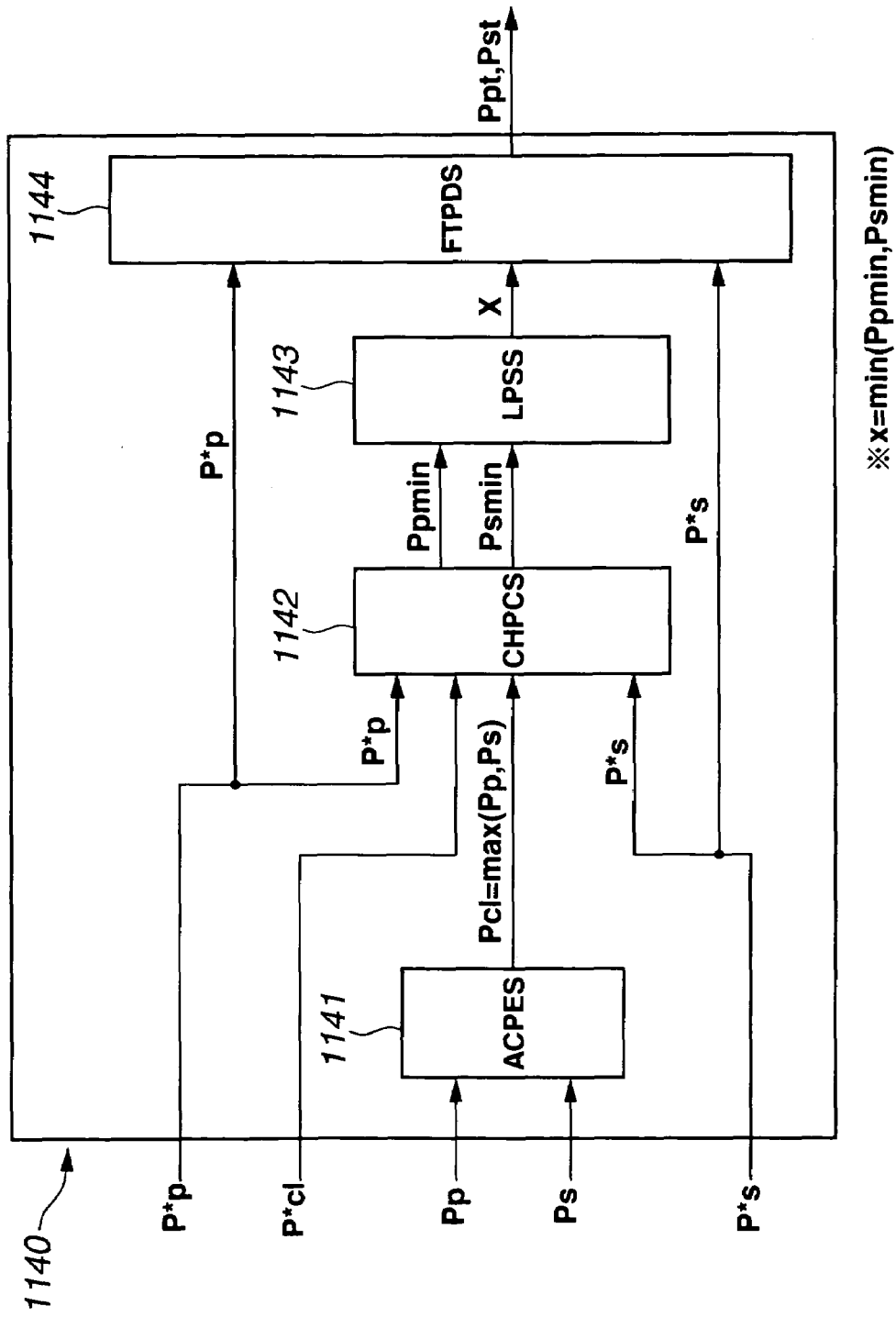
FIG. 11 is a block diagram of the detail of a final hydraulic pressure detecting section in the block diagram of FIG. 10.

FIG. 11 shows the detail of the final hydraulic pressure determining section (FHPDS) 1140. As shown, the FHPDS 1140 generally comprises an actual clamp pressure estimating section (ACPES) 1141, a corrected hydraulic pressure calculating section (CHPCS) 1142, a lower pressure selection section (LPSS) 1143 and a final target pressure determining section (FTPDS) 1144.

In the ACPES 1141, based on the actual pulley pressures "Pp" and "Ps" in the primary and secondary piston chambers 1312 and 1322, an actual clamp pressure "Pcl" is estimated, which is led to the CHPCS 1142. In the second embodiment of the present invention, the higher one of the primary and secondary pulley pressures "Pp" and "Ps" is used as the clamp pressure that is led to both the clamp chambers 1313 and 1323. Thus, higher one of the actual pulley pressures "Pp" and "Ps" is estimated as the actual clamp pressure "Pcl".

In the CHPCS 1142, based on the parameters "P*p", "P*s", "P*cl" and "Pcl" led thereto, corrected hydraulic pressures "Ppmin" and "Psmin" that are the minimum values for achieving target thrusts for the primary and secondary pulleys are calculated, which are led to the LPSS 1143.

In the LPSS 1143, the corrected hydraulic pressures "Ppmin" and "Psmin" are compared and a lower one of the two "Ppmin" and "Psmin" is selected. If the "Ppmin" is lower than the "Psmin", the "Ppmin" is selected and led to the FTPDS 1144. While, the "Psmin" is lower than the "Ppmin", the "Psmin" is selected and led to the FTPDS 1144.

Figure 12:
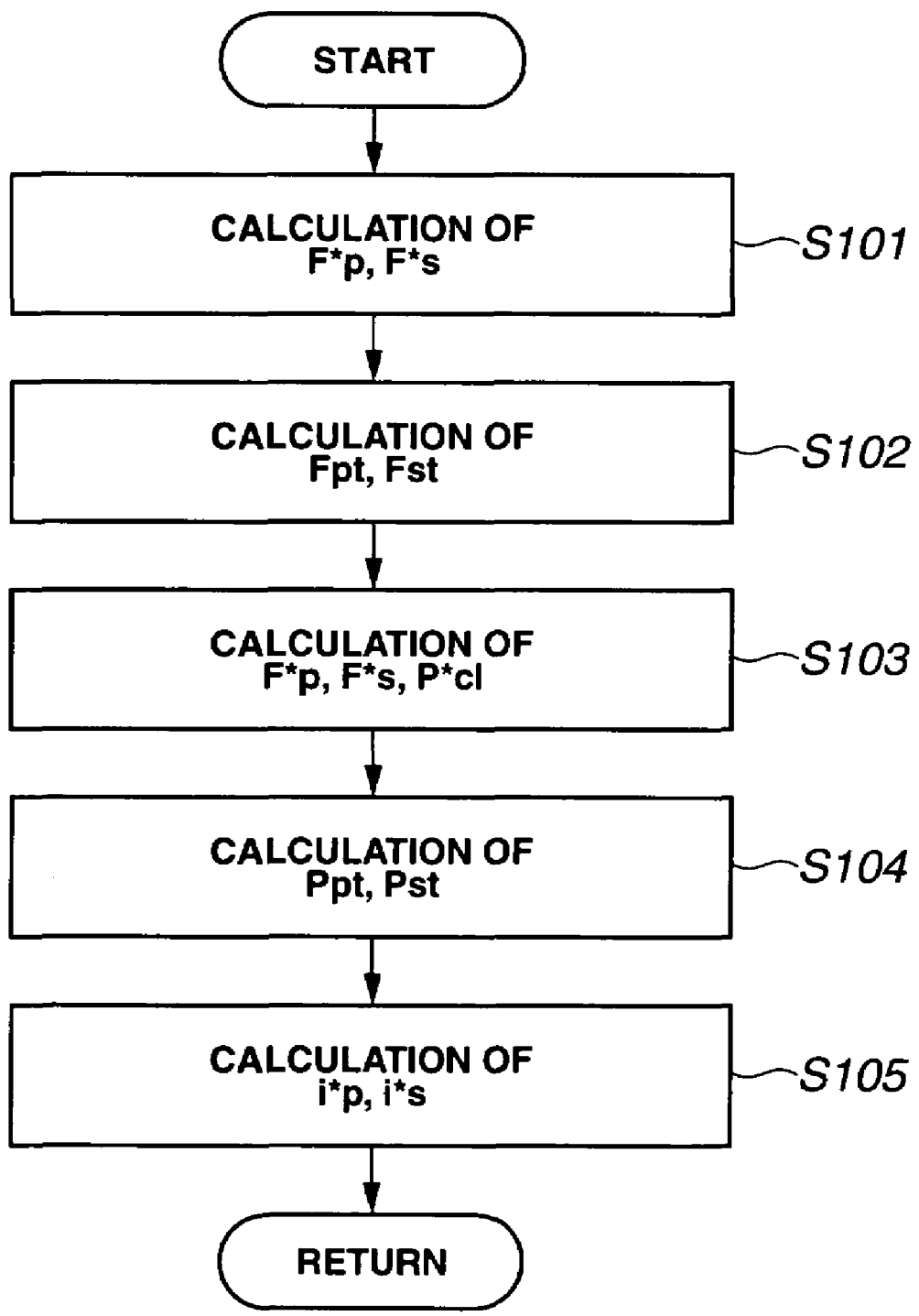
FIG. 12 is a flowchart showing programmed operation steps executed by the control unit employed in the second embodiment.

FIG. 12 is a flowchart showing programmed operation steps executed by the control unit 1100 for controlling the thrusts for the primary and secondary pulleys.

At step S101, based on the parameters "Np", "Ns", "Ne", "TVO" and "VSP", the target thrusts "F*p" and "F*s" for the primary and secondary pulleys 1310 and 1320 are calculated. This calculation is carried out in the TTCS 1110.

At step S102, based on the actual pulley pressures "Pp" and "Ps" in the primary and secondary piston chambers 1312 and 1322 and the spring forces and the centrifugal hydraulic pressures that hold the slidable pulley parts 1311 and 1321, the target thrusts "F*p" and "F*s" are corrected to produce the target thrust corrected values "Fpt" and "Fst". This calculation is carried out in the TCS 1120.

At step S103, based on the target thrust corrected values "Fpt" and "Fst", the target piston pressures "P*p" and "P*s" for the piston chambers 1311 and 1321 and the target clamp pressure "P*cl" for the clamp chambers 1313 and 1323 are calculated. This calculation is carried out in the HPCS 1130.

At step S104, by correcting the target pressures "P*p" and "P*s", the final target pressures "Ppt" and "Pst" that can avoid the belt slippage are calculated. This calculation is carried out in the FHPDS 1140.

And at step S105, the control currents "i*p" and "i*s" for the primary and secondary solenoid valves 1061 and 1062 are calculated by subjecting the final target pressures "Ppt" and "Pst" to the feedback control. This calculation is carried out in the HPCS 1150.

FIG. 13 shows the detail of the step S104 of the flowchart of FIG. 12.

At step S201, the actual pulley pressures "Pp" and "Ps" are read. This reading is carried out in the ACPEC 1141.

At step S202, judgment is carried out as to whether the actual primary pressure "Pp" is larger than the actually secondary pressure "Ps" or not. If YES, the operation flow goes to step S203, and if NO, the operation flow goes to step S204.

At step S203, "Pcl=Pp" is established, and the operation flow goes to step S205. While, at step S204, "Pcl=Ps" is established and the operation flow goes to step S206.

At step S205, judgment is carried out as to whether "P*cl" is lower than "Pp" or not. If YES, the operation flow goes to step S209. If NO, the operation flow goes to step S207.

At step S206, judgment is carried out as to whether "P*cl" is lower than "Pp" or not. If YES, the operation flow goes to step S212, while, if NO, the operation flow goes to step S208.

At step S207, the corrected hydraulic pressure "Psmin" for the secondary pulley is calculated, and then, the operation flow goes to step S210.

At step S208, the corrected hydraulic pressure "Ppmin" for the primary pulley is calculated, and then, the operation flow goes to step S211.

At step S209, the final target pressures "Ppt" and "Pst" are outputted as the target pressures "P*p" and "P*s", and then, the operation flow goes to step S105 of the flowchart of FIG. 12.

At step S210, the final target pressures "Ppt" and "Pst" are outputted as the corrected pressures "P*p" and "Psmin", and then operation flow goes to step S105.

At step S211, the final target pressures "Ppt" and "Pst" are outputted as the corrected pressures "Ppmin" and "P*s", and then the operation flow goes to step S105.

At step S212, the final target pressures "Ppt" and "Pst" are outputted as the target pressures "P*p" and "P*s", and then the operation flow goes to step S105.

In the following, an advantageous operation of the second embodiment of the present invention will be described.

In a case wherein the actual pressure of the secondary side is higher than that of the primary side and thus the actual secondary pressure "Ps" is used as the actual clamp pressure "Pcl" and the actual secondary pressure "Ps" fails to reach the target pressure "P*s", the target clamp pressure "P*cl" and the actual clamp pressure "Pcl" are compared. If the actual clamp pressure "Pcl" is lower than the target clamp pressure "P*cl", the difference "ΔPcl=P*cl−Pcl" is calculated and then the difference corresponding thrust "ΔF=Acl×ΔP" is calculated. Since the relation "Pcl=Ps" is made, the hydraulic pressure "ΔPp=Acl/Ap(P*s−Ps)" that corresponds to the "ΔF" is added to the primary side to produce the primary side corrected hydraulic pressure "Ppmin", and the pressure "Ppmin" and the target pressure "P*s" are used as the final target pressures "Ppt" and "Pst".

While, in a case wherein the actual primary pressure "Pp" is used as the actual clamp pressure "Pcl" and the actual primary pressure "Pp" fails to reach the target pressure "P*p", the target clamp pressure "P*cl" and the actual clamp pressure "Pcl" are compared. If the actual clamp pressure "Pcl" is lower than the target clamp pressure "P*cl", the difference "ΔPcl=P*cl−Pcl" is calculated and then the difference corresponding thrust "ΔF=Acl×ΔP" is calculated. Since the relation "Pcl=Ps" is made, the hydraulic pressure "ΔPs=Acl/Ap (P*p−Pp)" that corresponds to the "ΔF" is added to the secondary side to produce the secondary side corrected hydraulic pressure "Psmin", and the target pressure "P*p" and the corrected pressure "Psmin" are used as the final target pressures "Ppt" and "Pst".

As is understood from the above description, in the second embodiment, even if a sufficient pulley pressure is not obtained, due to the poor responsibility of the hydraulic pressure or the like, undesired belt slippage is assuredly suppressed and thus a smoothed speed change is exhibited by the transmission. Due to practical usage of the final target pressures "Ppt" and "Pst" which are produced by correcting the target pressures "P*p" and "P*s", the feedback operation is much assuredly made as compared with a known hydraulic feedback system.

In the primary and secondary side corrected hydraulic pressures "Ppmin" and "Psmin", a lower one is selected. Accordingly, the hydraulic control can be carried out without largely increasing the integrated value of the error that would be inevitably produced in a known hydraulic feedback control. Thus, the hydraulic control in the second embodiment has a higher stability.

In the primary and secondary actual pressures "Pp" and "Ps", a higher one is used as the actual clamp pressure "Pcl". Thus, the hydraulic pressure of the entire construction of the hydraulic system can be controlled relatively low. Thus, the load of the oil pump is reduced and thus the fuel consumption of the associated automotive engine is reduced. Since the higher one in the primary and secondary actual pressures "Pp" and "Ps" is used as the actual clamp pressure "Pcl", there is no need of providing the clamp chambers with pressure sensors that detect the clamp pressure "Pcl", which induces an economical production of the transmission.

The entire contents of Japanese Patent Application 2004-374684 filed Dec. 24, 2004 and Japanese Patent Application 2004-324177 filed Nov. 8, 2004 are incorporated herein by reference.

Although the invention has been described above with reference to the embodiments of the invention, the invention is not limited to such embodiments as described above. Various modifications and variations of such embodiments may be carried out by those skilled in the art, in light of the above description.

What is claimed is:

1. A double piston and belt type continuously variable transmission comprising:
    a primary pulley provided with a primary piston chamber and a primary clamp chamber;
    a secondary pulley provided with a secondary piston chamber and a secondary clamp chamber;
    an endless belt operatively put around the primary and secondary pulleys; and
    a switching circuit that includes a switching valve that selectively connects both the primary and secondary clamp chambers to either one of the primary and secondary piston chambers, the selected piston chamber being higher in hydraulic pressure than the other piston chamber, so that the higher hydraulic pressure in the selected piston chamber is led into both the primary and secondary clamp chambers,
    wherein the switching circuit comprises a hydraulic passage that connects the primary and secondary clamp chambers, and
    wherein the switching valve is arranged in the hydraulic passage to connect the hydraulic passage to the selected piston chamber.

2. The double piston and belt type continuously variable transmission as claimed in claim 1, in which the switching valve comprises:
    a valve body having first, second and third ports and a spool bore, the first port being connected to the primary piston chamber, the second port being connected to the secondary piston chamber and the third port being connected to both the primary and secondary clamp chambers through the hydraulic passage;
    a spool axially movable in the spool bore of the valve body between a first position where the first and third ports are communicated while closing the second port and a second position where the second and third ports are communicated while closing the first port; and
    a biasing spring that biases the spool in a direction to take the second position.

3. The double piston and belt type continuously variable transmission as claimed in claim 1, in which the switching valve is constructed to select the higher pressure mechanically.

4. The double piston and belt type continuously variable transmission as claimed in claim 2, in which the biasing spring is arranged to cause the spool to take the second position when the pressure in the primary piston chamber and the pressure in the secondary piston chamber are equal in magnitude.

5. The double piston and belt type continuously variable transmission as claimed in claim 2, in which the third port of the valve body is positioned between the first and second ports.

6. The double piston and belt type continuously variable transmission as claimed in claim 1, further comprising:
    a pressure control circuit that connects the primary and secondary piston chambers and the primary and secondary clamp chambers by hydraulic passages; and
    a control unit that is connected to the pressure control circuit, the control unit being configured to carry out:
        detecting pressures of the primary and secondary piston chambers;
        deriving an actual clamp pressure that is actually exerted in the primary and secondary clamp chambers;
        calculating a difference between the actual clamp pressure and a target clamp pressure when the actual clamp pressure is lower than the target clamp pressure;
        calculating a thrust that corresponds to the calculated difference;
        calculating a hydraulic pressure that is needed for producing the calculated thrust; and
        adding the calculated hydraulic pressure to the pressure of either one of the primary piston chamber and the secondary piston chamber that has a pressure lower than that of the other of the primary piston chamber and the secondary piston chamber.

7. The double piston and belt type continuously variable transmission as claimed in claim 6, in which the control unit is configured to carry out adding the calculated hydraulic pressure to a target pressure of either one of the primary and secondary piston chambers.

8. The double piston and belt type continuously variable transmission as claimed in claim 6, in which the detection of the pressures in the primary and secondary piston chambers is carried out by two pressure sensors that are respectively received in circuits directly connected to the primary and secondary piston chambers.

9. The double piston and belt type continuously variable transmission as claimed in claim 8, in which the actual clamp pressure is detected by comparing information signals issued from the two pressure sensors.

10. The double piston and belt type continuously variable transmission as claimed in claim 6, in which the pressure control circuit comprises:
    a line pressure passage in which a line pressure is exerted;
    a pilot pressure passage in which a pilot pressure is exerted;
    a primary pressure control valve through which the line pressure passage is connected to the primary piston chamber;
    a secondary pressure control through which the line pressure passage is connected to the secondary piston chamber;
    a primary solenoid valve that actuates the primary pressure control valve upon receiving the pilot pressure and an instruction signal from the control unit; and
    a secondary solenoid valve that actuates the secondary pressure control valve upon receiving the pilot pressure and an instruction signal form the control unit.

11. The double piston and belt type continuously variable transmission as claimed in claim 10, in which the line pressure passage is connected to an oil pump through a first pressure control valve, and the pilot pressure passage is connected to an outlet port of the first pressure control valve through a second pressure control valve.

12. A double piston and belt type continuously variable transmission comprising:
    a primary pulley provided with a primary piston chamber and a primary clamp chamber;
    a secondary pulley provided with a secondary piston chamber and a secondary clamp chamber;

an endless belt operatively put around the primary and secondary pulleys;

a hydraulic passage that connects the primary and secondary clamp chambers;

a pressure control circuit that connects the primary and secondary piston chambers and the primary and secondary clamp chambers by hydraulic passages, wherein the pressure control circuit includes a switching valve that selectively connects both the primary and secondary clamp chambers to either one of the primary and secondary piston chambers; and a control unit that is connected to the control circuit, the control unit being configured to carry out:

detecting pressures of the primary and secondary piston chambers;

deriving an actual clamp pressure that is actually exerted in the primary and secondary clamp chambers;

calculating a difference between the actual clamp pressure and a target clamp pressure when the actual clamp pressure is lower than the target clamp pressure;

calculating a thrust that corresponds to the calculated difference;

calculating a hydraulic pressure that is needed for producing the calculated thrust; and adding the calculated hydraulic pressure to the pressure of either one of the primary piston chamber and the secondary piston chamber that has a pressure lower than that of the other of the primary piston chamber and the secondary piston chamber.

13. The double piston and belt type continuously variable transmission as claimed in claim 1, wherein the switching valve directly connects the hydraulic passage to the selected piston chamber.

14. The double piston and belt type continuously variable transmission as claimed in claim 12, wherein the switching valve directly connects the hydraulic passage that connects the primary and secondary clamp chambers to the selected piston chamber.

* * * * *